United States Patent [19]
Yamamoto et al.

[11] Patent Number: 5,283,289
[45] Date of Patent: *Feb. 1, 1994

[54] FIBER-REINFORCED RUBBER COMPOSITION AND PRODUCTION PROCESS THEREOF AND FIBER-REINFORCED ELASTIC PRODUCT

[75] Inventors: Shinji Yamamoto, Yotsukaido; Kouhei Kaijiri, Chiba; Kouichi Nagakura; Denichi Oda, both of Ichihara; Yasuo Matsumori, Ube; Kimio Nakayama, Ichihara, all of Japan

[73] Assignee: UBE Industries, Ltd., Ube, Japan

[*] Notice: The portion of the term of this patent subsequent to Jul. 22, 2003 has been disclaimed.

[21] Appl. No.: 717,572

[22] Filed: Jun. 19, 1991

Related U.S. Application Data

[62] Division of Ser. No. 45,536, May 4, 1987, Pat. No. 5,043,388, which is a division of Ser. No. 788,524, Oct. 21, 1985, Pat. No. 4,703,086, which is a division of Ser. No. 439,176, Nov. 4, 1982, abandoned.

[30] Foreign Application Priority Data

Nov. 5, 1981 [JP] Japan ............... 56-176428
Feb. 9, 1982 [JP] Japan ............... 57-18185
Sep. 2, 1982 [JP] Japan ............... 57-151687

[51] Int. Cl.$^5$ ............... C08L 77/00; C08F 8/30
[52] U.S. Cl. ............... 525/133; 264/210.1; 264/211.24; 525/935
[58] Field of Search ............... 525/133; 264/210.1, 264/211.24

[56] References Cited

U.S. PATENT DOCUMENTS

| | | | |
|---|---|---|---|
| 2,683,697 | 1/1951 | Newell et al. | 525/935 |
| 4,703,086 | 10/1987 | Yamamoto et al. | 525/133 |
| 5,043,388 | 8/1991 | Yamamoto et al. | 525/133 |

*Primary Examiner*—Ana L. Carrillo
*Attorney, Agent, or Firm*—Finnegan, Henderson, Farabow, Garret, Dunner

[57] ABSTRACT

A fiber-reinforced rubber composition capable of providing a vulcanizate having an excellent strength and modulus and a production process thereof. This fiber-reinforced rubber composition includes fine short fibers of thermoplastic polymer having

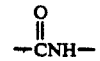

groups buried in vulcanizable rubber. The vulcanizable rubber and the thermoplastic polymer are grafted to each other through a resol type alkylphenol formaldehyde resin precondensate or a novolak type phenol formaldehyde resin precondensate at an interface of the fiber. The ratio of the fiber to the vulcanizable rubber (A) 1 to 70 parts by weight based on 100 parts by weight of the rubber in the case of the resol type alkylphenol formaldehyde resin precondensate or (B) 1 to 100 parts by weight based on 100 parts by weight of the rubber in the case of the novolak type phenol formaldehyde resin precondensate.

20 Claims, No Drawings

FIBER-REINFORCED RUBBER COMPOSITION AND PRODUCTION PROCESS THEREOF AND FIBER-REINFORCED ELASTIC PRODUCT

This is a division of application Ser. No. 07/045,536, filed May 4, 1987, now U.S. Pat. No. 5,043,388, which is a division of U.S. Ser. No. 06/788,524 filed Oct. 21, 1985, now U.S. Pat. Ser. No. 4,703,086, which is a divisional of U.S. Ser. No. 06/439,176 filed Nov. 4, 1982, now abandoned.

The present invention relates to a novel fiber-reinforced rubber composition capable of providing a vulcanizate (i.e., fiber-reinforced elastic product) having an excellent strength and modulus and to a production process thereof and a production process of a fiber-reinforced elastic product.

Fiber-reinforced rubber compositions have heretofore been prepared by incorporating short fibers made of, for example, nylon (or polyamide), polyester, or formalized polyvinyl alcohol into vulcanizable rubber. The fiber-reinforced rubber compositions thus produced, however, have disadvantages in that the strength and modulus of the vulcanizates derived therefrom, especially at high elongation, are not sufficiently high. This is because the diameter of the fibers is large and no bonding is present between fiber and the rubber. Thus, development of fiber-reinforced rubber compositions capable of providing vulcanizates having a higher strength and modulus has been desired.

Under these circumstances, U.S. Pat. No. 4,202,850 proposes a process for producing fiber-reinforced elastic articles in which the disadvantages of the known fiber-reinforced rubber compositions are solved by mixing vulcanizable rubber and powdered 1,2-polybutadiene, followed by extruding and rolling. The production of fiber-reinforced rubber compositions capable of providing reinforced vulcanizates having an excellent strength and modulus is described in the examples of U.S. Pat. No. 4,202,850. However, 1,2-polybutadiene, which is used as the fiber-forming polymer, has a 1-2 structure content of 80% or more and a melting point of 130° or more. The strength of fibers formed from 1,2-polybutadiene is small. The fiber-reinforced rubber compositions thus produced, therefore, have disadvantages in that, the fibers break into shorter fiber lengths during the rubber processing, especially the kneading thereof with carbon black, and the modulus of vulcanizates thereof at a low elongation decreases. Furthermore, fatigue properties of the fiber-reinforced elastic articles, especially under severe conditions of a high temperature and a high stress, are not sufficient. As a result, these fiber-reinforced elastic articles cannot be used as belts or inner members of a tire, such as a carcass and a bead.

Japanese Unexamined Patent Publication (Kokai) No. 53-8682 proposes a fiber-reinforced rubber composition produced by mixing a fiber-forming polymer with rubber, followed by extrusion of the kneaded compound. This fiber-reinforced rubber composition, however, has disadvantages of low tensile strength, modulus at a high elongation, and peeling strength exhibiting an adhesive force with other materials, of the vulcanizates thereof because fibers having a large diameter and film are formed and because no bonding is present between the rubber and polymer (i.e., fiber) at the interface of the fibers and the rubber. Thus, a fiber-reinforced rubber composition suitable for use as members of a tire cannot be obtained according to the proposed method.

In order to improve conventional fiber-reinforced rubber compositions, the inventors proposed a process for producing fiber-reinforced rubber compositions in Japanese Patent Application No. 56-117044. According to this process, a composition containing a block copolymer of liquid diene-type rubber and nylon compounded in a vulcanizable rubber is melt extruded to form fibers from nylon, while the vulcanizable rubber and the liquid diene-type rubber are grafted to each other. This production process, however, involves practical disadvantages in that the reproducibility of the block polymerization is not good and the production cost is high.

An object of the present invention is to eliminate the above-mentioned disadvantages of the prior art and to provide a fiber-reinforced rubber composition capable of providing a vulcanizate having an excellent strength and modulus.

Another object of the present invention is to provide a process for producing a fiber-reinforced rubber composition capable of providing a vulcanizate having an excellent strength and modulus.

Other objects and advantages of the present invention will be apparent from the following description.

In accordance with the present invention, there is provided a fiber-reinforced rubber composition comprising vulcanizable rubber including fine short fibers of thermoplastic polymer having

groups buried therein, wherein: the vulcanizable rubber and the thermoplastic polymer are grafted to each other through a resol type alkylphenol formaldehyde resin precondensate or a novolak type phenol formaldehyde resin precondensate at an interface of the fiber; and the ratio of the fiber to the vulcanizable rubber is (A) 1 to 70 parts by weight based on 100 parts by weight of the rubber in the case of the resol type alkylphenol formaldehyde resin precondensate or (B) 1 to 100 parts by weight based on 100 parts by weight of the rubber in the case of the novolak type phenol formaldehyde resin precondensate.

In accordance with the present invention, there is also provided a process for producing a fiber-reinforced rubber composition comprising the steps of: mixing vulcanizable rubber, a thermoplastic polymer having

groups and having a number-average molecular weight of less than 200000, and 0.2 to 2.5 parts by weight, based on 100 parts by weight of the total amount of the rubber and the thermoplastic polymer, of a resol type alkylphenol formaldehyde resin precondensate together at a temperature of not less than the melting point of the thermoplastic polymer, but not more than 270°C.; optionally adding an additional amount of the vulcanizable rubber to the mixture as long as the ratio of the thermoplastic polymer to the vulcanizable rubber in the resultant mixture is within a range of 1 to 70 parts by weight based on 100 parts by weight of the vulcanizable rubber and further mixing the resultant mixture at a temperature of not less than the melting point of the thermoplastic polymer but not more than 270° C.; extruding the mixture from an extruder at a temperature of not less than the melting point of the thermoplastic polymer but not more than 270° C.; and drawing an extrudate at a temperature of less than the melting point of the thermoplastic polymer.

In accordance with the present invention, there is further provided a process for producing a fiber-reinforced rubber composition comprising the steps of: mixing vulcanizable rubber, thermoplastic polymer having

groups and having a number-average molecular weight of less than 200000, 0.2 to 5 parts by weight, based on 100 parts by weight of the total amount of the rubber and the thermoplastic polymer, of a novolak type phenol formaldehyde resin precondensate and a compound capable of producing formaldehyde upon heating together at a temperature of not less than the melting point of the thermoplastic polymer, but not more than 270° C.; optionally adding an additional amount of the vulcanizable rubber to the mixture as long as the ratio of the thermoplastic polymer to the vulcanizable rubber in the resultant mixture is within a range of 1 to 100 parts by weight of the thermoplastic polymer based on 100 parts by weight of the vulcanizable rubber and further mixing the resultant mixture at a temperature of not less than the melting point of the thermoplastic polymer but not more than 270° C.; extruding the mixture from an extruder at a temperature of not less than the melting point of the thermoplastic polymer but not more than 270° C.; and drawing an extrudate at a temperature of less than the melting point of the thermoplastic polymer.

In accordance with the present invention, there is further provided a process for producing a fiber-reinforced elastic product comprising the steps of:
(1) preparing a compound of a fiber-reinforced rubber composition and a vulcanizing agent and optional vulcanizable rubber in such an amount that the amount of the fine short fiber of the thermoplastic polymer is 1 to 20 parts by weight based on 100 parts by weight of the total vulcanizable rubber, said fiber-reinforced rubber composition comprising a vulcanizable rubber including fine short fibers of thermoplastic polymer having

groups buried therein, wherein:
said vulcanizable rubber and said thermoplastic polymer are grafted to each other through a resol type alkylphenol formaldehyde resin precondensate or a novolak type phenol formaldehyde resin precondensate at an interface of the fiber; and
the ratio of the fiber to the vulcanizable rubber (A) 1 to 70 parts by weight based on 100 parts by weight of the rubber in the case of the resol type alkylphenol formaldehyde resin precondensate or (B) 1 to 100 parts by weight based on 100 parts by weight of the rubber in the case of the novolak type phenol formaldehyde resin precondensate; and
(2) valcanizing the resultant compound.

The term "grafted" used herein means that the thermoplastic polymer and the vulcanizable rubber are bonded to each other irrespective of the bonding manner or mechanism.

According to the present invention, a fiber-reinforced rubber composition having an excellent productivity and working properties and capable of providing a vulcanizate, i.e., a fiber-reinforced elastic product having an excellent modulus at both low and high elongation, and an excellent tensile strength and adhesive force can be produced.

The vulcanizable rubber usable in the present invention includes those which can be vulcanized to form rubber elastic articles. Typical examples of such rubber are natural rubber (NR), cis-1,4-polybutadiene, polyisoprene, polychloroprene, styrene-butadiene copolymer rubber, isoprene-isobutylene copolymer rubber, ethylene-propylene-unconjugated diene terpolymer or any mixture thereof. Of these materials, the use of natural rubber is desirable because no substantial gelation occurs when a mixture of vulcanizable rubber, thermoplastic polymer having

groups, and a resol type alkylphenol formaldehyde precondensate or a novolak type phenol formaldehyde resin precondensate is mixed and is extruded.

According to the present invention, a thermoplastic polymer having

groups is buried in the above-mentioned vulcanizable rubber in the form of fine short fibers in an amount of (A) 1 to 70 parts by weight, desirably 10 to 60 parts by weight, based on 100 parts by weight of the rubber in the case of the resol type alkylphenol formaldehyde resin precondensate or (B) 1 to 100 parts by weight, desirably 1 to 70 parts by weight and more desirably 30 to 70 parts by weight, based on 100 parts by weight of the rubber in the case of the novolak type phenol formaldehyde resin precondensate. The thermoplastic polymer having

groups is grafted to the vulcanizable rubber through a crosslinking agent, i.e., a resol type alkylphenol formaldehyde precondensate or a novolak type phenol formaldehyde resin precondensate at an interface of the fiber of the thermoplastic resin.

Typical examples of the above-mentioned thermoplastic resin having

groups are those having a melting point of 190° C. to 235° C., desirably 190° C. to 225° C. and more desirably 200° C. to 220° C., for example, nylon such as nylon 6, nylon 610, nylon 12, nylon 611, and nylon 612; polyurea such as polyheptamethylene urea and polyundecamethylene urea; and polyurethane. These materials can be used alone or in any mixture thereof.

The fine short fibers of the thermoplastic polymer buried in the vulcanizable rubber generally have a circular cross-section having a diameter of 0.05 to 0.8 μm, desirably 0.05 to 0.5 μm. The shortest length of the fine short fibers is generally 1 μm or more, desirably 8 μm or more. The molecules of the thermoplastic resin are oriented in the direction of the fiber axis.

The resol type alkylphenol formaldehyde resin precondensates usable in the present invention are resinous crosslinking agents having the general formula:

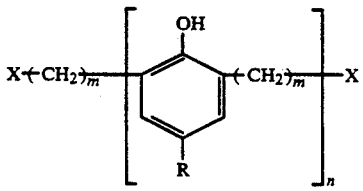

[I]

wherein R is an alkyl group having 1 to 15 carbon atoms, or a combination of said alkyl group and a hydrogen atom; X is a hydroxyl group or a halogen atom such as chlorine or bromine; m is 1 or 2; and n is a number of 2 to 15. Typical examples of such precondensates are resol-type precondensates or their modified products, obtained from reactions of alkylphenols such as cresol with formaldehyde or acetaldehyde in the presence of an alkaline catalyst. Precondensates having two or more methylol groups in one molecule are desirably used in the present invention. Examples of the commercially available resinous crosslinking agents are: Sumilite Resin PR-22193, Sumilite Resin PR-50994, Sumilite Resin PR-175, Sumilite Resin PR-50530, Sumilite Resin PR-51466, Sumilite Resin PR-22193, and Sumilite Resin PR-28633 (all manufactured by Sumitomo Durez Co., Ltd.); Tackiroll 201, Tackiroll 250-I, Tackiroll 250-II, and Tackiroll 250-III (all manufactured by Sumitomo Chemical Co., Ltd.); pp-4507 (Gunei Chemical Industry Co., Ltd.); Tamanol 521 (Arakawa Chemical Industry Co., Ltd.); Schenectady SP1059, and Schenectady SP1055 (both manufactured by Schenectady Chemicals Co., Ltd.); CRR-0803 (Union Carbide Co., Ltd.); Synphorm C1000 and C1001 (both manufactured by Anchor Chemicals Co., Ltd.); and Vulkaresat 510E and 532E, Vulkaresen 105E and 130E, and Vulkaresol 315E (all manufactured by Hoechst & Chemicals, Ltd.). Alkylphenol formaldehyde resin precondensates containing various compounded additives such as a thickener, a solvent, and a plasticizer may also be used in the present invention.

As mentioned hereinabove, the resol type alkylphenol formaldehyde resin precondensate is used in the vulcanizable rubber in an amount of 0.2 to 2.5 parts by weight based on 100 parts by weight of the total amount of the rubber and the thermoplastic polymer. A precondensate in an amount of less than the lower limit of the above-mentioned range does not improve the strength, modulus and adhesion properties of the vulcanizate derived therefrom. A precondensate in an amount of more than the upper limit of the above-mentioned range makes it difficult to obtain the desired rubber composition capable of producing a vulcanizate having excellent modulus.

The novolak type phenol formaldehyde resin precondensates usable in the present invention are soluble and meltable resins or their modified products, obtained from condensation reactions of phenols such as phenol or bisphenol with formaldehyde (or paraformaldehyde) in the presence of a known acidic catalyst such as sulfuric acid, hydrochloric acid, phosphoric acid, or oxalic acid. Typical examples of the novolak type phenol formaldehyde resin precondensates desirably usable in the present invention are novolak type phenol formaldehyde resin precondensates having the general formula

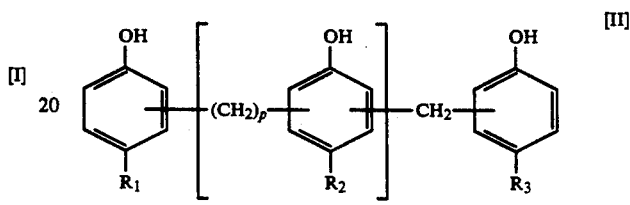

[II]

wherein $R_1$, $R_2$ and $R_3$ are independently a hydrogen atom, or an alkyl group having 1 to 15 carbon atoms, p is 1 or 2, and q is a number of 0 to 13; or a styrenated phenol-phenol-formaldehyde resin precondensate;

a p-cumylphenol-formaldehyde resin precondensate;

a phenyl phenol-formaldehyde resin precondensate;

a lactum-bisphenol F-formaldehyde resin precondensate;

a bisphenol A-formaldehyde resin precondensate;

a xylenol-formaldehyde resin precondensate;

or the denatured phenol-formaldehyde resin precondensates with cashew nut shell liquid, rosin, drying oil or synthetic rubber.

As mentioned above, the novolak type phenol formaldehyde resin precondensate is used in the vulcanizable rubber in an amount of 0.2 to 5 parts by weight based on 100 parts by weight of the total amount of the rubber and the thermoplastic polymer. A precondensate in an amount of less than the lower limit of the above-mentioned range does not improve the strength modulus and adhesion properties of the vulcanizate derived therefrom. A precondensate in an amount of more than the upper limit of the above-mentioned range results in the decrease in the modulus of the vulcanizate derived therefrom.

According to the present invention, since the strength of the fine fibers of the thermoplastic polymer having

groups buried in the vulcanizable rubber is strong and since the thermoplastic resin fibers and the vulcanizable rubber are grafted to each other through a resol type alkylphenol formaldehyde resin precondensate or a novolak type phenol formaldehyde resin precondensate at an interface of the fiber, a fiber-reinforced rubber composition capable of providing a vulcanizate having an excellent modulus at both low and high elongation and an excellent tensile strength and also having an excellent adhesion to a member such as vulcanized natural rubber or steel can be obtained.

The specific mechanism of forming the graft bonding of the vulcanizable rubber and the thermoplastic resin is not clearly understood, but it would seem that the graft bonding is formed according to the following reactions:

(1) In the case of a resol type alkylphenol formaldehyde resin precondensate having methylol groups (—CH$_2$OH), the graft bonding is formed by (i) a dehydration reaction between a hydrogen atom of a methylene group in the vulcanizable rubber molecule and a hydroxyl group of a methylol group in the alkylphenol formaldehyde resin precondensate molecule and (ii) a dehydration reaction between a hydrogen atom of a group

of thermoplastic polymer molecule and a hydroxyl group of the remaining methylol group of the alkylphenol formaldehyde resin precondensate molecule.

(2) In the case of a novolak type phenol formaldehyde resin precondensate, a compound capable of producing formaldehyde is used together with the precondensate, and the formaldehyde generated from the formaldehyde producing compound is first reacted with the novolak type phenol formaldehyde resin precondensate to form at least two methylol groups in the precondensate. The graft bonding is formed by (i) a dehydration reaction between a hydroxyl group in one of the formed methylol groups in the precondensate molecule and a hydrogen atom of a methylene group in the vulcanizable rubber molecule and (ii) a dehydration reaction between the hydroxyl group of the remaining methylol groups formed in the precondensate molecule and a hydrogen atom of a group

of the thermoplastic polymer molecule.

The desirable graft ratio of the present fiber-reinforced rubber composition is desirably 3% to 25% by weight, more desirably 5% to 20% by weight. The term "graft ratio" used herein means the percent ratio of the weight of the vulcanizable rubber graft bonded to the fiber of the thermoplastic polymer having

groups in an interface of the fiber to the weight of the thermoplastic polymer fiber buried in the vulcanizable rubber (i.e., vulcanizable rubber/thermoplastic polymer fiber × 100).

The production process of the present fiber-reinforced rubber composition will now be explained.

When the resol type alkylphenol formaldehyde resin precondensate is used, the vulcanizable rubber, the thermoplastic polymer having

groups and having a number-average molecular weight of less than 200,000, desirably 10,000 to 100,000, and 0.2 to 2.5 parts by weight, desirably 0.7 to 2.0 parts by weight, based on 100 parts by weight of the total amount of the rubber and the thermoplastic polymer, of the resol type alkylphenol formaldehyde resin precondensate are first mixed together at a temperature of not less than, desirably not less than 5° C. plus, the melting point of the thermoplastic polymer, but not more than 270° C., desirably not more than 260° C. The mixing can be carried out using any conventional mixing or kneading device, for example, a Brabender-Plastograph, a Banbury mixer, a roll mill, and an extruder. The desirable mixing time is 1 to 15 minutes.

The mixing ratio of the rubber and the thermoplastic polymer in the first step can be 1 to 2000 parts by weight, desirably 10 to 500 parts by weight, of the thermoplastic polymer having

groups, based on 100 parts of the vulcanizable rubber. Thus, the vulcanizable rubber and the thermoplastic polymer are effectively grafted to each other through the crosslinking agent (i.e., the resol type alkylphenol formaldehyde resin precondensate).

When the resol type alkylphenol formaldehyde resin precondensate is used in an amount of less than the lower limit of the above-mentioned range, it becomes difficult to obtain the desired fiber-reinforced rubber composition capable of producing a vulcanizate having an excellent modulus and strength and also having excellent adhesion properties to other materials. Contrary to this, when the resol type alkylphenol formaldehyde resin precondensate is used in an amount of more than the upper limit of the above-mentioned range, undesirable gelation occurs due to the reaction in the vulcanizable rubber or in the thermoplastic resin and, therefore, the desired fiber-reinforced rubber composition capable of producing a vulcanizate having an excellent modulus and strength becomes difficult to obtain.

The order of the addition of the above-mentioned components in the first mixing step of the present invention is not specifically limited. In order to prevent gelation of the vulcanizable rubber during the mixing step and the subsequent extruding step, a conventional low volatile antioxidant (i.e., an aging preventing agent) can be compounded in the vulcanizable rubber Examples of such antioxidants are N-(3-methacryloyloxy-2-hydroxypropyl)-N'-phenyl-p-phenylenediamine, phenyl-β-naphthylamine, phenyl-α-naphthylamine, aldol-β-naphthylamine, a reaction product of phenyl-naphthylamine and acetone, p-isopropoxydiphenylamine, p-(p-toluene sulfonylamide)-diphenylamine, a reaction product of diphenylamine and acetone, a reaction product of diphenylamine and diisobutylene, N,N'-diphenyl-p-phenylenediamine, N-isopropyl-N'-phenyl-p-phenylenediamine, N-cyclohexyl-N'-phenyl-p-phenylenediamine, N,N'-bis(1,4-dimethylpentyl)-p-phenylenediamine, a polymer of 2.2.4-trimethyl-1,2-dihydroquinoline, 6-dodecyl-2,2,4-trimethyl-1,2-dihydroquinoline, 2,6-di-tert-butyl-4-methylphenol, 6-tert-butyl-3-methylphenol derivatives, 2,6-di-tert-butyl-4-n-butylphenol, 4-hydroxymethyl-2,6-di-tert-butylphenol, 2-methyl-4,6-dinonylphenol, 2,6-di-tert-butyl-α-dimethylamine-p-cresol, 2,2-methylene-bis(4-methyl-6- cyclohexylphenol), 4,4'-methylene-bis(2,6-di-tert-butyl-phenol), 2,2'-methylene-bis(6-α-methyl-benzyl-p-cresol), 4,4'-butylidenebis(3-methyl-6-tert-butylphenol), and 2,2'-dihydroxy-3,3'-di(α-methylcyclohexyl)-5,5'-dimethyldiphenylmethane.

The mixture of the vulcanizable rubber, the thermoplastic polymer, and the resol type alkylphenol formaldehyde resin precondensate obtained in the first mixing step can be directly extruded as long as the ratio of the thermoplastic polymer to the vulcanizable rubber in the mixture is within the range of 1 to 70 parts by weight based on 100 parts by weight of the vulcanizable rubber. However, when the ratio of the thermoplastic polymer to the vulcanizable rubber is more than 1 part by weight based on 100 parts by weight of the vulcanizable rubber, an additional amount of vulcanizable rubber, which may be the same as or different from the vulcanizable rubber used in the first mixing step, can be added to the mixture so that the ratio of the thermoplastic polymer to the vulcanizable rubber in the resultant mixture is within the range of 1 to 70 parts by weight based on 100 parts by weight of the vulcanizable rubber. The additional mixing can be effected under the same conditions as those of the first mixing step.

When the novolalk type phenol formaldehyde resin precondensate is used, the vulcanizable rubber, the thermoplastic polymer having

groups and having a number-average molecular weight of less than 200,000, desirably 10,000 to 100,000, 0.2 to 5 parts by weight, desirably 0.5 to 5 parts by weight, and more desirably 0.5 to 3 parts by weight, based on 100 parts by weight of the total amount of the rubber and the thermoplastic polymer, of the novolak type phenol formaldehyde resin precondensate, and a compound capable of producing formaldehyde upon heating (i.e., formaldehyde producing compound) are first mixed together at a temperature of not less than, desirably not less than 5° C. plus, the melting point of the thermoplastic polymer, but not more than 270° C., desirably not more than 260° C. The mixing can be carried out using any conventional mixing or kneading device, for example, a Brabender-Plastograph, a Banbury mixer, a roll mill and an extruder. The desirable mixing time is 1 to 15 minutes.

The mixing ratio of the rubber and the thermoplastic polymer in the first step can be 1 to 2000 parts by weight, desirably 1 to 100 parts by weight, and more desirably 1 to 70 parts by weight, of the thermoplastic polymer having

groups, based on 100 parts of the vulcanizable rubber. Thus, the vulcanizable rubber and the thermoplastic polymer are effectively grafted to each other through the novolak type phenol formaldehyde resin precondensate by action of the formaldehyde producing compound.

The formaldehyde producing compounds usable in the present invention are those capable of producing formaldehyde upon heating. Examples of such compounds are hexamethylene tetramine, acetaldehyde ammonia

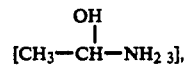

paraformaldehyde, α-polyoxymethylene, polyhydric methylol melamine derivatives, oxazolidine derivatives, and polyhydric methylol acetylene urea. These compounds can be used alone or in any mixture thereof.

The formaldehyde producing compound or compounds can be used desirably in an amount of 0.02 to 1 part by weight based on 100 parts by weight of the vulcanizable rubber.

When the novolak type phenol formaldehyde resin precondensate is used in an amount of less than the lower limit of the above-mentioned range, it becomes difficult to cause the desired graft reaction between the vulcanizable rubber and the thermoplastic resin through the novolak type phenol formaldehyde resin. As a result, fibers having a large diameter and film of the thermoplastic polymer are formed, and the bonding between the thermoplastic polymer and the vulcanizable rubber at an interface of the fiber is not strong. Accordingly, the strength, adhesion properties, and fatigue characteristics of the vulcanizate obtained from the resultant rubber composition are not improved. Contrary to this, when the novolak type phenol formaldehyde resin precondensate is used in an amount of more than the upper limit of the above-mentioned range, the strength and modulus of the vulcanizate obtained from the resultant rubber composition are not improved, because the fiber-forming properties of the reinforced rubber composition are decreased due to the occurrence of gelation of the thermoplastic polymer by action of the novolak type phenol formaldehyde resin precondensate.

The order of the addition of the above-mentioned components in the first mixing step of the present invention is not specifically limited. However, the following method is most desirable. That is, the vulcanizable rubber and, optionally, an antioxidant are first charged into a mixing device to effect mastication of the rubber. Then, the thermoplastic polymer having

groups is charged into the mixing device to effect the mixing. The thermoplastic polymer is melted during the mixing and, as a result, the thermoplastic polymer is dispersed in the vulcanizable rubber. Thereafter, the novolak type phenol formaldehyde resin precondensate is charged into the mixing device. After mixing, the formaldehyde producing substance is charged, and the mixing is effected for 1 to 15 minutes. As mentioned hereinabove, a conventional low volatile antioxidant can be compounded in the vulcanizable rubber, if desired.

The mixture of the vulcanizable rubber, the thermoplastic polymer, the novolak type phenol formaldehyde resin precondensate, and the formaldehyde producing compound obtained in the first mixing step can be directly extruded as long as the ratio of the thermoplastic polymer to the vulcanizable rubber in the mixture is within the range of 1 to 100 parts by weight based on 100 parts by weight of the vulcanizable rubber. However, when the ratio of the thermoplastic polymer to the vulcanizable rubber is more than 1 part by weight based on 100 parts by weight of the vulcanizable rubber, an additional amount of vulcanizable rubber, which may be the same as or different from the vulcanizable rubber used in the first mixing step, can be added to the mixture so that the ratio of the thermoplastic polymer to the vulcanizable rubber in the resultant mixture is within the range of 1 to 100 parts by weight based on 100 parts by weight of the vulcanizable rubber. The additional mixing can be effected under the same conditions as those of the first mixing step. Thus, the thermoplastic polymer is uniformly and finely dispersed in the vulcanizable rubber. The particle size of the dispersed thermoplastic polymer is generally 1 to 2 $\mu$m.

The mixture obtained above is then extruded by any conventional extruding means, e.g., a screw type extruder, at a temperature of not less than, desirably not less than 5° C. plus, the melting point of the thermoplastic polymer, but not more than 270° C., desirably not more than 260° C. The extrusion of the mixture may be carried out through a die such as a circular die or a rectangular die to form an extrudate in the form of a strand or sheet. In the case of a circular die, the use of a circular die having an inner diameter of the extruding nozzle of 0.1 to 5 mm and having the ratio (L/D) of length (L) to the inner diameter (D) of 1 to 20 is desirable. In the case of a rectangular die, the use of a rectangular die having a slit gap of 0.1 to 5 mm, a width of 0.2 to 200 mm, and a length of a die land of 10 to 20 mm is desirable. Of these dies, the use of a circular die is desirable. Circular dies having one extruding nozzle and many extruding nozzles (i.e., multifold type) can also be used in the practice of the present invention.

The extrudate obtained according to the present invention is in such a state that the vulcanizable rubber and the thermoplastic polymer are grafted to each other through the crosslinking agent (i.e., the resol type alkylphenol formaldehyde resin precondensate or the novolak type phenol formaldehyde resin precondensate).

The extrudate is then taken up at a temperature of less than the melting point of the thermoplastic polymer. For instance, the taking-up can be carried out as follows:

The extrudate obtained above is first cooled to a temperature of less than the melting point of the thermoplastic polymer by air cooling, water cooling, or inert solvent cooling (e.g., cooling in which cooled methanol is used) or by making the distance between the die and the winding machine (or take-up machine) longer, desirably while the extrudate is continuously stretched. The cooled extrudate is wound by a winding machine such as a bobbin or take-up rolls. Thus, the spherical particles of the thermoplastic polymer in the rubber are transformed into fibers under the stress applied to the extrudate by the taking-up operation. The desirable winding rate is 1 to 100 m/min and more desirably 20 to 40 m/min. The desirable temperature of the winding machine during winding of the extrudate is 0° C. to 100° C., and the desirable draft ratio is 1.5 to 50, more desirably 3 to 20. When the extrudate is taken-up or wound without cooling, a portion of the fibrous thermoplastic polymer often becomes flat (a film in the extreme case) and, therefore, it is liable that good results cannot be obtained.

The cooled extrudate is rolled by means of a pair of pressure rolls or is subjected to a uniaxial drawing by means of a pair of draft rolls. The extrudate is desirably rolled by means of a pair of pressure rolls in such a manner that the rolled extrudate has a diameter or a thickness of two-thirds or less of that of the original extrudate and a thickness of 0.02 mm or more. The desirable pressure roll temperature is 0° C. to 100° C. The desirable draw ratio is 1.1 to 10 and the desirable draft roll temperature is 0° C. to 100° C.

As mentioned hereinabove, according to the present invention, the molecules of the fibrous thermoplastic polymer dispersed in the vulcanizable rubber of the resultant reinforced rubber composition is highly oriented parallel to the fiber axis direction by drawing of the extrudate. Thus, fine short fibers of the thermoplastic polymer having a high strength are formed in the resultant fiber-reinforced rubber composition. As a result, the fiber-reinforced rubber composition which is capable of, alone or as a blend of other vulcanizable rubber therewith, producing a vulcanizate having an excellent modulus at both low elongation and high elongation, an excellent tensile strength, and an excellent adhesion to various members can be obtained. The fiber-reinforced rubber composition also has an excellent processability or workability.

The fiber-reinforced rubber composition of the present invention can be vulcanized to form a vulcanizate, i.e., a fiber-reinforced elastic product. The fiber-reinforced rubber composition can be used alone or together with additional vulcanizable rubber. Generally speaking, when the fiber-reinforced rubber composition contains 1 to 20 parts by weight of the thermoplastic polymer fiber based on 100 parts by weight of the vulcanizable rubber, the rubber composition may be directly vulcanized by adding a vulcanizing agent thereto. On the other hand, when the fiber-reinforced rubber composition does not contain 1 to 20 parts by weight of the thermoplastic polymer fiber based on 100 parts by weight of the vulcanizable rubber, additional vulcanizable rubber is desirably added, together with a vulcanizing agent, to the rubber composition prior to the vulcanization. The kind of the additional vulcanizable rubber is not specifically limited. The additional vulcanizable rubber may be the same as or different from the vulcanizable rubber in the fiber-reinforced rubber composition. The additional vulcanizable rubber can be selected depending upon the intended final use.

When the amount of the thermoplastic resin fiber in the composition to be vulcanized (i.e., compound) is less than 1 part by weight based on 100 parts by weight of the vulcanizable rubber in the compound, an elastic product (i.e., a vulcanizate) having an excellent strength and modulus cannot be obtained. Contrary to this, when the amount of the thermoplastic resin fiber is more than 20 parts by weight based on 100 parts by weight of the vulcanizable rubber in the compound, the elongation and strength of the an elastic product tend to decrease.

The vulcanizing agents usable in vulcanization of the present fiber-reinforced rubber composition can be any conventional vulcanizing agent such as sulfur, organic peroxides, and sulfur-containing compounds. The compounding of the vulcanizing agent into the fiber-reinforced rubber composition can be carried out in any conventional manner. The desirable amount of the vulcanizing agent is 0.5 to 10 parts by weight based on 100 parts by weight of the rubber.

Various conventional additives can also be used in the vulcanization of the present fiber-reinforced rubber composition. Examples of such additives are: reinforcing agents such as various grades of carbon black, white carbon, activated calcium carbonate, ultrafinely powdered magnesium silicate, high styrene resin, cumarone-indene resin, phenol resin, lignin, modified melamine resin, petroleum resin; fillers such as various grades of calcium carbonate, basic magnesium carbonate, clay, zinc oxide, diatomaceous earth, reclaimed rubber, powdered rubber, and ebonite powder; vulcanization accelerators such as aldehyde ammonias, aldehydeamines, guanidines, thioureas, thiazoles, thiurams, dithiocarbamates, and xanthates; vulcanization accelerator aids such as metal oxides and fatty acids,; and antioxidants such as aminealdehydes, amineketones, amines, phenols, imidazoles, and sulfur-containing; and phosphorous-containing antioxidants.

The vulcanization per se can be carried out by any conventional method. Although the vulcanization temperature largely depends on the kind of the vulcanizable rubber to be vulcanized and the intended use of the vulcanizate, it is generally 120° C. to 180° C.

The vulcanizate, i.e., the fiber-reinforced elastic product thus obtained, has an excellent modulus at both low and high elongation, an excellent tensile strength and tear strength, and excellent adhesion properties and fatigue characteristics.

The fiber-reinforced rubber composition of the present invention can be suitably used as tire inner members such as belts, carcasses, and beads; tire outer members such as treads and sidewalls; industrial applications such as belts and hoses; and footwear.

The present invention will now be further illustrated by, but is by no means limited to, the following examples, all parts and percentages are expressed on a weight basis unless otherwise specified. The physical properties, other than fatigue and abrasion, of vulcanizates obtained from fiber-reinforced rubber compositions of the following examples were determined according to JIS (Japanese Industrial Standards) K 6301 methods. Mooney viscosities $ML_{1+4}$ (100° C.) of fiber-reinforced rubber compounds were determined according to a JIS K 6300 method.

EXAMPLE 1

Thirty five parts of natural rubber (NR) having a viscosity of $1 \times 10^6$ poise was charged into a Brabender Plastograph and was masticated at a temperature of 245° C. at a rotor revolution number of 50 rpm for a period of 30 seconds. Then, 0.126 parts of alkylphenol formaldehyde resin (Tamanol 521, manufactured by Arakawa Chemical Industry Co., Ltd.) was charged and was mixed for a period of 30 seconds. Thereafter, 7 parts of 6-nylon (6-nylon 1030 B manufactured by Ube Industries, Ltd., melting point 221° C., molecular weight 30000) was charged and was further mixed at a temperature of 245° C. for a period of 4 minutes.

The resultant mixture was extruded at a die temperature of 245° C. into a strand having a diameter of about 2 mm by using an extruder provided with a circular die having an inner nozzle diameter of 2 mm and a ratio (L/D) of a length L to an inner diameter D of 2 (manufactured by Haake Co.). The strand was wound on a bobbin through a funnel located at a position perpendicularly downward from the nozzle and guide rolls at a draft ratio of 7. The funnel was assembled such that a cooling water having a temperature of 0° C. was circulated through the funnel to a cooling water reservoir located at a position perpendicularly downward from the funnel by means of a pump and a piping system. The wound strand was vacuum dried at a room temperature for one day to remove the attached water therefrom and, then, was rolled by using a pair of pressure rolls having a temperature of 60° C. and a roll nip of 0.1 mm. Thus, a fiber-reinforced rubber composition (sample 1) was obtained.

Determination of Graft Ratio

Two grams of the fiber-reinforced rubber composition obtained above was added to 200 ml of benzene at a room temperature and the rubber content in the composition was dissolved in the benzene. The slurry thus obtained was centrifugally separated into a solution portion and a precipitation portion the precipitation portion was repeatedly subjected to the above-mentioned procedure seven times. Thereafter, the final precipitation portion was dried to obtain nylon fiber. The nylon fiber thus obtained was dissolved in a mixed solvent of phenol and orthodichlorobenzene (a weight ratio of 1:3) and was analyzed according to a $^1$H nuclear magnetic resonance (NMR) spectrum analysis by using as an internal standard tetramethylsilane. From the NMR chart, a mol ratio of 6-nylon and natural rubber was determined by a measurement of the area of the signals of the methyl and methylene groups derived from natural rubber, the methylene group adjacent to the CO group, the methylene group adjacent to the NH group and the other three methylene groups, derived from 6-nylon. Thus, the graft ratio was calculated. The shape of the nylon fiber was observed by using a scanning electron microscope (manufactured by Hitachi, Ltd.) at a magnification time of 10,000. The fiber was extremely fine fiber having a circular cross-section.

The results are shown in Table 1 below.

Evaluation test

The fiber-reinforced rubber composition obtained above was vulcanized at a temperature of 150° C. for a period of 40 minutes according to the formulation as shown in Table 2 below. The results are also shown in Table 2.

EXAMPLE 2

Thirty five parts of the NR used in Example 1 was charged into a Brabender Plastograph and was masticated at a temperature of 245° C. at 50 rpm for 20 seconds. Then, 0.35 parts of N-(3-methacryloyloxy-2-hydroxypropyl)-N'-phenyl-p-phenylenediamine (Nocrac G-1, Ouchi-Shinko Chemical Industry Co., Ltd.) was charged and was mixed for a period of 4.5 minutes. Thereafter, 17.5 parts of the 6-nylon used in Example 1 was charged and was further mixed for 4 minutes. Finally, 0.788 parts of the same alkylphenol formaldehyde resin precondensate as used in Example 1 was charged and was mixed at a temperature of 245° C. at 100 rpm for 2 minutes. A fiber-reinforced rubber composition (sample 2) was prepared from the resultant mixture obtained above in the same manner as in Example 1.

The results are shown in Tables 1 and 2.

COMPARATIVE EXAMPLE 1

Thirty five parts of the NR used in Example 1 was charged into a Brabender Plastograph and was masticated at a temperature of 245° C. at 50 rpm for 1 minute. Then, 10.5 parts of the 6-nylon used in Example 1 was charged and was further mixed for 4 minutes. A fiber-reinforced rubber composition (sample 3) was prepared from the resultant mixture obtained above in the same manner as in Example 1. The composition contained a large amount of the nylon in the form of film.

The results are shown in Tables 1 and 2.

EXAMPLE 3

Forty parts of the 6-nylon used in Example 1 was charged into a Brabender Plastograph and was mixed at a temperature of 245° C. at 50 rpm for 9 minutes to completely melt the 6-nylon. Then, 15 parts of the NR used in Example 1 was charged and was further mixed for 1.5 minutes. Thereafter, 0.275 parts of the alkylphenol formaldehyde resin precondensate used in Example 1 was charged and was mixed for 3.5 minutes. The resultant mixture (i.e., first mixture) was taken out from the Brabender Plastograph and was granulated.

At the second step, 30.7 parts of the NR used above was charged into the Brabender Plastograph and masticated at a temperature of 245° C. at 50 rpm for 30 seconds. Then, 14.4 parts of the granulated mixture obtained above was charged and was further mixed for 4.5 minutes.

The resultant mixture (i.e., the second mixture) was extruded into an extrudate in the form of a strand in the same manner as in Example 1 and the extrudate was cooled, while stretching, under water cooling through the funnel used in Example 1 without being wound onto a bobbin. The resultant extrudate in the form of a strand was rolled in the same manner as in Example 1 to prepare a fiber-reinforced rubber composition (sample 4).

The results are shown in Tables 1 and 2.

EXAMPLE 4

A fiber-reinforced rubber composition (sample 5) was prepared in the same manner as in Example 3, except that the amount of the alkylphenol formaldehyde resin precondensate was changed from 0.275 parts to 0.825 parts and the draft ratio in the winding of the extrudate onto the bobbin was changed from 7 to 7.7.

The results are shown in Tables 1 and 2.

EXAMPLE 5

A fiber-reinforced rubber composition (sample 6) was prepared in the same manner as in Example 3, except that the amount of the granulated mixture was changed from 14.4 parts to 20.7 parts and the amount of the NR was changed from 30.7 parts to 24.4 parts.

The results are shown in Tables 1 and 2.

EXAMPLE 6

A fiber-reinforced rubber composition (sample 7) was prepared in the same manner as in Example 5, except that 1 PHR each of N-(3-methacryloyloxy-2-hydroxypropyl)-N'-phenyl-p-phenylenediamine was charged to the NR during the mixing thereof in the first and second steps.

The results are shown in Tables 1 and 2.

EXAMPLE 7

Forty parts of the 6-nylon used in Example 1 was charged into a Brabender Plastograph and was mixed at a temperature of 245° C. at 50 rpm for 9 minutes to completely melt the 6-nylon. Then, 15.975 parts of a mixture obtained by mixing 100 parts of NR used in Example 1, 5.5 parts of the alkylphenol formaldehyde resin precondensate and 1.0 part of N-(3-methacryloyloxy-2-hydroxypropyl)-N'-phenyl-p-phenylenediamine used in Example 2 at 60° C. on 3 inch rolls was charged into the Brabender Plastograph and was mixed for 3.5 minutes.

The resultant mixture (i.e., the first mixture) was taken out from the Brabender Plastograph and was granulated. Then, 30.721 parts of NR and 0.307 parts of N-(3-methacryloyloxy-2-hydroxypropyl)-N'-phenyl-p-phenylenediamine) were charged into the Brabender Plastograph and was masticated at a temperature of 245° C. and at 50 rpm for 1 minute. Thereafter, 14.533 parts of the granulated mixture was charged and was mixed for 4.5 minutes. A fiber-reinforced composition (sample 8) was prepared from the mixture obtained above (i.e., the second mixture) in the same manner as used in Example 1.

The results are shown in Tables 1 and 2.

EXAMPLE 8

A fiber-reinforced rubber composition (sample 9) was prepared in the same manner as used in Example 7, except that the amount of the granulated mixture was changed from 14.533 parts to 17.991 parts and the amount of N-(3-methacryloyloxy-2-hydroxypropyl)-N'-phenyl-p-phenylenediamine was changed from 0.307 parts to 0.273 parts.

The results are shown in Tables 1 and 2.

EXAMPLE 9

A fiber-reinforced rubber composition (sample 10) was prepared in the same manner as used in Example 7, except that the amount of the granulated mixture was changed from 14.533 parts to 20.991 parts, the amount of N-(3-methacryloyloxy-2-hydroxypropyl)-N'-phenyl-p-phenylenediamine was changed from 0.307 parts to 0.244 parts and the amount of NR was changed from 30.721 parts to 24.375 parts.

The results are shown in Tables 1 and 2.

EXAMPLE 10

A fiber-reinforced rubber composition (sample 11) was prepared in the same manner as in Example 7, except that the amount of the granulated mixture was changed from 14.533 parts to 23.614 parts, the amount of NR was changed from 30.721 parts to 21.797 parts, and the amount of N-(3-methacryloyloxy-2-hydroxypropyl)-N'-phenyl-p-phenylenediamine was changed from 0.307 parts to 0.218 parts.

The results are shown in Tables 1 and 2.

COMPARATIVE EXAMPLE 2

A fiber-reinforced rubber composition (sample 12) was prepared in the same manner as described in Example 7, except that the amount of the granulated mixture was changed from 14.533 parts to 27.988 parts, the amount of the natural rubber was changed from 30.721 parts to 17.500 parts, and the amount of N-(3-methacryloyloxy-2-hydroxypropyl)-N'-phenyl-p-phenylenediamine was changed from 0.307 parts to 0.218 parts. This composition contained a large number of nylon in the form of a film, together with nylon fiber.

The results are shown in Tables 1 and 2.

EXAMPLE 11

Forty parts of the 6-nylon used in Example 1 was charged into a Brabender Plastograph and was mixed at a temperature of 245° C. at 50 rpm for 9 minutes to completely melt the 6-nylon. Then, 100 parts of the NR used in Example 1, 1.0 part of N-(3-methacryloyloxy-2-hydroxylpropyl)-N'-phenyl-p-phenylenediamine used in Example 2, and 1.833 parts of the alkylphenol formaldehyde resin precondensate used in Example 1, were rolled at 60° C. on 3 inch rolls. 15.425 parts of the mixture thus obtained was charged, added to the molten nylon in the Brabender Plastograph and was further mixed for 3.5 minutes. The resultant mixture (i.e., first mixture) was taken out from the Brabender Plastograph and was granulated.

At the second step, 24.375 parts of the NR and 0.244 parts of N-(3-methacryloyloxy-2-hydroxypropyl)-N'-phenyl-p-phenylenediamine both used above were charged into the Brabender Plastograph and masticated at a temperature of 245° C. at 50 rpm for 30 seconds. Then, 20.784 parts of the granulated mixture obtained above was charged and was further mixed for 4.5 minutes.

A fiber-reinforced rubber composition (sample 13) was prepared from the resultant mixture (i.e., the second mixture) in the same manner as in Example 1.

The results are shown in Tables 1 and 2.

EXAMPLES 12 and 13

Fiber-reinforced rubber compositions (samples 14 and 15) were prepared in the same manner as in Example 11, except that the amounts of the alkylphenol formaldehyde resin precondensate used in Example 1 were changed from 1.833 parts to 3.667 parts (sample 14) and 7.333 parts (sample 15), the amounts of the granulated mixture were changed from 20.784 parts to 20.888 parts (sample 14) and 21.094 parts (sample 15), and the mixing and extrusion temperatures were changed from 245° C. to 250° C. (only in sample 15).

The results are shown in Tables 1 and 2.

COMPARATIVE EXAMPLE 3

The evaluation test results of the natural rubber used in Example 1 are shown in Table 2 as sample 16.

TABLE 1

| Example No. | Sample No. | First mixture Content of each component in mixture (Wt. ratio) | | | Extrudate Content of each component in extrudate (Wt. ratio) | | | Winding condition of extrudate |
|---|---|---|---|---|---|---|---|---|
| | | Total of NR and 6-nylon | Tamanol 521 | 6-Nylon/NR × 100 | NR | 6-Nylon | G-1[2] | |
| Example 1 | 1 | 100 | 0.3 | 20 | 100 | 20 | 0 | Fairly good |
| Example 2 | 2 | 100 | 1.5 | 50 | 100 | 50 | 1.0 | Good |
| Comparative Example 1 | 3 | 100 | 0 | 30 | 100 | 30 | 0 | Poor Many breaking |
| Example 3 | 4 | 100 | 0.5 | 267 | 100 | 30 | 0 | Fairly good |
| Example 4 | 5 | 100 | 1.5 | 267 | 100 | 30 | 0 | Good |
| Example 5 | 6 | 100 | 0.5 | 267 | 100 | 50 | 0 | " |
| Example 6 | 7 | 100 | 0.5 | 267 | 100 | 50 | 1.0 | " |
| Example 7 | 8 | 100 | 1.5 | 267 | 100 | 30 | 1.0 | Very good |
| Example 8 | 9 | 100 | 1.5 | 267 | 100 | 40 | 1.0 | " |
| Example 9 | 10 | 100 | 1.5 | 267 | 100 | 50 | 1.0 | " |
| Example 10 | 11 | 100 | 1.5 | 267 | 100 | 60 | 1.0 | " |
| Comparative Example 2 | 12 | 100 | 1.5 | 267 | 100 | 80 | 1.0 | Poor Unstable extrusion |
| Example 11 | 13 | 100 | 0.5 | 267 | 100 | 50 | 1.0 | Very good |
| Example 12 | 14 | 100 | 1.0 | 267 | 100 | 50 | 1.0 | " |
| Example 13 | 15 | 100 | 2.0 | 267 | 100 | 50 | 1.0 | " |
| Comparative Example 3 | 16 | — | — | — | — | — | — | — |

| Example No. | Fiber-reinforced rubber composition | | | | |
|---|---|---|---|---|---|
| | Sample No. | Graft ratio (wt %) | Shape of nylon fiber | Average diameter of fiber (μm) | Length of[3] fiber (μm) |
| Example 1 | 1 | 4 | Fine fiber | 0.5 | ≧8 |
| Example 2 | 2 | 10 | " | 0.2 | ≧15 |
| Comparative Example 1 | 3 | 0 | Thick fiber Filmy product | 5 | >50 |
| Example 3 | 4 | 8 | Fine fiber | 0.4 | 1~10[4] |
| Example 4 | 5 | 13 | " | 0.3 | ≧10 |
| Example 5 | 6 | 7 | " | 0.5 | ≧10 |
| Example 6 | 7 | 10 | " | 0.4 | ≧10 |
| Example 7 | 8 | 13 | " | 0.2 | ≧15 |
| Example 8 | 9 | 13 | " | 0.2 | ≧15 |
| Example 9 | 10 | 13 | " | 0.2 | ≧15 |
| Example 10 | 11 | 13 | " | 0.2 | ≧15 |
| Comparative Example 2 | 12 | 13 | Thick fiber Filmy product | 5 | >50 |
| Example 11 | 13 | 7 | Fine fiber | 0.3 | ≧15 |
| Example 12 | 14 | 10 | " | 0.2 | ≧15 |
| Example 13 | 15 | 13 | " | 0.2 | ≧15 |
| Comparative Example 3 | 16 | — | — | — | — |

[1] Alkylphenol formaldehyde resin (manufactured by Arakawa Chemical Co., Ltd.)
[2] N-(3-methacryloyloxy-2-hydroxypropyl)-N'-phenyl-p-phenylenediamine
[3] "≧8" means that the shortest fiber length is 8 μm. The average fiber length could not be determined except for Example 3.
[4] The average fiber length is 5 μm.

TABLE 2

| Example No. | | Example 1 | Example 2 | Comparative Example 1 | Example 3 | Example 4 | Example 5 | Example 6 | Example 7 |
|---|---|---|---|---|---|---|---|---|---|
| Amount of NR (part) | | 68.0 | 87.2 | 78.7 | 78.7 | 78.7 | 87.2 | 87.2 | 78.7 |
| Sample No. | | 1 | 2 | 3 | 4 | 5 | 6 | 7 | 8 |
| Amount (part) | | 38.4 | 19.6 | 27.7 | 27.7 | 27.7 | 19.3 | 19.3 | 28.1 |
| Carbon black[1] | (part) | 50 | | | | | | | |
| Process Oil | (") | 5 | | | | | | | |
| Zinc oxide | (") | 5 | | | | | | | |
| Stearic acid | (") | 3 | | | | | | | |
| 810 NA[2] | | 1.2 | " | " | " | " | " | " | " |
| #224[3] | | 0.8 | | | | | | | |
| DM[4] | | 0.6 | | | | | | | |
| M[5] | | 0.2 | | | | | | | |
| Sulfur | | 2.5 | | | | | | | |
| Ratio of nylon fiber to rubber content (PHR) | | 6.4 | 6.4 | (6.4)[7] | 6.4 | 6.4 | 6.4 | 6.4 | 6.4 |
| 50% modulus | (kg/cm$^2$) | 48 | 63 | 80 | 40 | 52 | 57 | 64 | 54 |
| 100% modulus | (") | 74 | 88 | 91 | 65 | 78 | 79 | 85 | 82 |
| 200% modulus | (") | 132 | 140 | 124 | 131 | 136 | 129 | 140 | 138 |
| 300% modulus | (") | 199 | 205 | 182 | 187 | 207 | 198 | 211 | 204 |
| Tensile strength at break | (") | 283 | 288 | 242 | 273 | 289 | 287 | 278 | 284 |
| Elongation | (%) | 422 | 408 | 380 | 421 | 414 | 425 | 385 | 419 |
| Peeling strength[6] | (kg) | >50 | >50 | 9 | >50 | >50 | >50 | >50 | >50 |
| Overall evaluation | | Good | Good | Poor | Good | Good | Good | Good | Good |

| Example No. | | Example 8 | Example 9 | Example 10 | Comparative Example 2 | Example 11 | Example 12 | Example 13 | Comparative Example 3 |
|---|---|---|---|---|---|---|---|---|---|
| Amount of NR (part) | | 84.0 | 87.2 | 89.3 | 90.8 | 87.2 | 87.2 | 87.2 | 0 |
| Sample No. | | 9 | 10 | 11 | 12 | 13 | 14 | 15 | 16 |
| Amount (part) | | 22.7 | 19.5 | 17.3 | 15.7 | 19.4 | 19.4 | 19.7 | 100 |
| Carbon black[1] | (part) | 50 | | | | | | | |
| Process oil | (") | 5 | | | | | | | |
| Zinc oxide | (") | 5 | | | | | | | |
| Stearic acid | (") | 3 | | | | | | | |
| 810 NA[2] | | 1.2 | " | " | " | " | " | " | " |
| #224[3] | | 0.8 | | | | | | | |
| DM[4] | | 0.6 | | | | | | | |
| M[5] | | 0.2 | | | | | | | |
| Sulfur | | 2.5 | | | | | | | |
| Ratio of nylon fiber to rubber content (PHR) | | 6.4 | 6.4 | 6.4 | (6.4)[7] | 6.4 | 6.4 | 6.4 | 0 |
| 50% modulus | (kg/cm$^2$) | 68 | 66 | 63 | 89 | 79 | 69 | 64 | 17 |
| 100% modulus | (") | 95 | 96 | 91 | 111 | 107 | 101 | 93 | 31 |
| 200% modulus | (") | 148 | 152 | 149 | 160 | 159 | 156 | 148 | 81 |
| 300% modulus | (") | 214 | 219 | 217 | 229 | 224 | 224 | 215 | 147 |
| Tensile strength at break | (") | 279 | 286 | 289 | 245 | 278 | 291 | 260 | 283 |
| Elongation | (%) | 398 | 400 | 403 | 314 | 380 | 381 | 390 | 479 |
| Peeling strength[6] | (kg) | >50 | >50 | >50 | 10 | >50 | >50 | >50 | >50 |
| Overall evaluation | | Good | Good | Good | Good | Good | Good | Good | Fairly poor |

[1] Diablack 1 manufactured by Mitsubishi Chemical Industries Ltd.,
[2] N-phenyl-N'-isopropyl-p-phenylenediamine manufactured by Ouchi-Shinko Chemical Industry Co., Ltd.
[3] 2,2,4-trimethyl-1,2-dihydroquinoline (Nocrac 224 manufactured by Ouchi-Shinko Chemical Industry Co., Ltd.)
[4] Dibenzothiazyl disulfide manufactured by Ouchi-Shinko Chemical Industry Co., Ltd.
[5] Melcaptobenzothiazole manufactured by Ouchi-Shinko Chemical Industry Co., Ltd.
[6] This strength exhibits adhesion properties to vulcanized natural rubber
[7] Total amounts of nylon fiber and nylon in the form of film.

COMPARATIVE EXAMPLE 4

One hundred parts by weight of NR used in Example 1 was charged into a Brabender Plastograph and was masticated at a temperature of 80° C. at 50 rpm for 30 seconds. Then, 5 parts of 6-nylon fiber having a length of 2 mm was charged thereto and was mixed for 30 seconds. According to a HRH system (A tricomponent system consisting of Hexamethylenetetramine, Resorcinol and fine particle Hydrated silica.: "reference" G. C. Derringer Rubber World 165 45 (1971)) formulation, 15 parts of silica, 3 parts of zinc oxide, 2.5 parts of resorcinol and 2 parts of stearic acid were charged into the Brabender Plastograph and were mixed together for 4 minutes.

The resultant mixture was charged onto 3 inch rolls and, then, 2 parts of sulfur, 1.6 parts of hexamethylene tetramine, and 1 part of dibenzothiazyl disulfide were added thereto and was mixed together at a temperature of 80° C. A compound (sample 17) was sheeted and, then, was fed to a mold, where vulcanization was carried out at a temperature of 150° C. for 40 minutes. The physical properties of the vulcanizate were determined. The results are shown in Table 3.

COMPARATIVE EXAMPLE 5

Comparative Example 4 was repeated, except that no nylon fiber was compounded in a mixture (sample 18). The results are shown in Table 3.

TABLE 3

| Comparative Example No. | 4 | 5 |
|---|---|---|
| Sample No. | 17 | 18 |
| Amount of NR (part) | 100 | 100 |
| Ratio of nylon fiber to rubber content (PHR) | 5 | 0 |

TABLE 3-continued

| Comparative Example No. | 4 | 5 |
| --- | --- | --- |
| Silica (part) | 15 | |
| Zinc oxide | 3 | |
| Resorcinol | 2.5 | |
| Stearic acid | 2 | The same as left |
| Sulfur | 2 | |
| Hexamethylenetetramine | 1.6 | |
| DM[1)] | 1 | |
| 100% Modulus (kg/cm$^2$) | 32 | 9 |
| 300% Modulus (kg/cm$^2$) | 48 | 26 |
| Tensile strength (kg/cm$^2$) at break | 51 | 175 |
| Elongation (%) | 350 | 670 |

[1)]Dibenzothiazyl disulfide manufactured by Ouchi-Shinko Chemical Industry Co., Ltd.

The vulcanizates obtained from samples 1, 2, 4 to 11 and 13 to 15 exhibited smooth "reverse S type" stress-strain curves. Contrary to this, the vulcanizates obtained from samples 3 and 17 exhibited stress-strain curves having undulation turbulence from the point at a strain of around 50%.

Vulcanizates were obtained from the fiber-reinforced rubber composition of Example 9 and NR of Comparative Example 3 at a temperature of 150° C. for priods listed in Table 4. The physical properties of the vulcanizates thus obtained were determined.

A PICO abrasion test of the vulcanizates was carried out according to a ASTM-D-2228 method.

A fatigue test was carried out in air at a temperature of 100° C. by using a constant load tensile fatigue test machine (Model S6T manufactured by Toyo Seiki K.K.). A 50% modulus retention rate (%) and tensile break strength retention rate (%) [i.e., (values after fatigue test/values before fatigue test)×100] after the samples were subjected to 1×10$^4$ times tensile test under a load of 30 Kg/cm$^2$ were determined. The times (i.e., fatigue life) by which the samples were broken by the repeated tension were determined under a constant load of 50 Kg/cm$^2$.

TABLE 4

| Sample No. | | 10 | 16 |
| --- | --- | --- | --- |
| Hardness (degree) | | 71 | 63 |
| Tear strength (Kg/cm)[a)] | | 100 | 91 |
| Flexing resistance[b)] | (times) | 45000 | 90000 |
| | (times) | 13300 | 16600 |
| Impact resilience (%) | | 49 | 50 |
| PICO abrasion[b)] | | 145 | 120 |
| 50% modulus retention rate (%) | | 100 | 0 |
| Fatigue test[a)] | | | |
| Tensile break strength retention rate (%) | | 85 | 0 |
| Fatigue life | (times) | 6.1 × 10$^3$ | 0.9 × 10$^3$ |

[a)]Vulcanization time = 40 minutes
[b)]Vulcanization time = 30 minutes

The results shown in Table 4 clearly exhibit that the fiber-reinforced rubber composition of the present invention provides the vulcanizate having an excellent properties under a high temperature and high stress.

EXAMPLE 14

Forty parts of 6-nylon used in Example 1 was charged into a Brabender Plastograph and was mixed at a temperature of 245° C. and at 50 rpm for 9 minutes to completely melt the 6-nylon. One hundred parts of NR used in Example 1, 5.5 parts of the alkylphenol formaldehyde resin precondensate used in Example 1, and 1.0 part of N-(3-methacryloyloxy-2-hydroxypropyl)-N'-phenyl-p-phenylenediamine were mixed at a temperature of 60° C. by using 3 inch rolls. Then, 15.975 parts of the resultant mixture was charged into the 6-nylon in the Brabender Plastograph and the mixture further mixed for 3.5 minutes. The resultant mixture (i.e., the first mixture) in which 1.5 parts of the alkylphenol formaldehyde resin precondensate based on 100 parts of the total amount of the 6-nylon and NR was included was taken out from the Brabender Plastograph and was granulated. Thereafter, 30.721 parts of the NR used above and 0.307 parts of N-(3-methacryloyloxy-2-hydroxylpropyl)-N'-phenyl-p-phenylenediamine were charged into the Brabender Plastograph and were mixed at a temperature of 245° C. and at 50 rpm for 1 minute. Then, 14.533 parts of the granulated mixture obtained above was charged and the mixture was further mixed for 4.5 minutes.

The resultant mixture (i.e., the second mixture) was extruded at a die temperature of 245° C. into a strand having a diameter of 2 mm by using the extruder used in Example 1. The strand was wound on a bobbin through the funnel used in Example 1 at a draft ratio of 7. The wound strand was vacuum dried at a room temperature for one day to remove the attached water therefrom and, then, was rolled by using a pair of pressure rolls having a temperature of 60° C. and a roll nip of 0.1 mm. Thus, a fiber-reinforced rubber composition (sample 19) was obtained.

From this fiber-reinforced rubber composition, a compound to be vulcanized was prepared according to the formulation shown is table 6 below and the resultant composition was vulcanized at a temperature of 150° C. for 40 minutes to prepare a vulcanizate (i.e., a fiber-reinforced elastic product). The results are shown in Tables 6 and 8 below.

The graft ratio of the fiber-reinforced rubber composition obtained above was determined in the same manner as used in Example 1. The result is shown in Table 5 below.

Furthermore, the shape of the nylon fiber in the fiber-reinforced rubber composition was observed in the same manner as in Example 1. The nylon fiber was extremely fine fiber having a circular cross-section. The results are shown in Table 5 below.

COMPARATIVE EXAMPLE 6

Thirty five parts of NR used in Example 14 was charged into a Blabender Plastograph and was masticated at a temperature of 240° C. and at 50 rpm for 1 minute. Then, 10.5 parts of the 6-nylon used in Example 14 was charged and the mixture was further mixed for 4 minutes. The resultant first mixture containing no alkylphenol formaldehyde resin precondensate was extruded to prepare a fiber-reinforced rubber composition (sample 20) in the same manner as in Example 14. The resultant rubber composition contained a large amount of the nylon in the form of film.

The results are shown in Tables 5 and 6.

EXAMPLE 15

A fiber-reinforced rubber composition (sample 21) was prepared in the same manner as in Example 14, except that the amount of the granulated mixture (i.e., the first mixture) was changed from 14.533 parts to 20.991 parts, the amount of N-(3-methacryloyloxy-2-hydroxypropyl)-N'-phenyl-p-phenylenediamine was changed from 0.307 parts to 0.244 parts, and the amount of the NR was changed from 30.721 parts to 24.375 parts.

From the resultant mixture, a composition to be vulcanized was prepared according to the formulation shown in Table 6 and was vulcanized at a temperature of 150° C. for 40 minutes to produce a fiber-reinforced elastic sheet having a thickness of 2 mm.

The results are shown in Tables 5, 6 and 8.

EXAMPLES 16 TO 20 AND COMPARATIVE EXAMPLE 7

Compounds to be vulcanized were prepared in the same manner as in Example 15, except that the compounding ratios of the fiber-reinforced rubber composition (sample 21) and the additional vulcanizable rubber (i.e., NR) were changed as shown in Table 6. The resultant compounds were vulcanized at a temperature of 150° C. for 40 minutes to produce fiber-reinforced elastic products.

The results are shown in Tables 6 and 8.

EXAMPLES 21 TO 24

Compounds to be vulcanized were prepared in the same manner as in Example 15, except that the compounding ratios of carbon black were changed as shown in Table 7. The resultant compounds were vulcanized to produce fiber-reinforced elastic products.

The results are shown in Tables 7 and 8.

COMPARATIVE EXAMPLES 8 TO 11

Compounds to be vulcanized were prepared in the same manner as in Comparative Example 6, except that the compounding ratios of carbon black were changed as shown in Table 7. The resultant compounds were vulcanized to produce fiber-reinforced elastic products.

The results are shown in Tables 7 and 8.

EXAMPLES 25 TO 30 AND COMPARATIVE EXAMPLES 12 TO 17

Compounds to be vulcanized were prepared in the same manner as in Example 15 or Comparative Example 6, except that the kinds and the amounts of the compounding chemicals, compounding agents, and/or additional vulcanizable rubber were changed and were vulcanized at a temperature of 150° C. for 40 minutes (or at a temperature of 150° C. for 30 minutes in Example 27 and Comparative Example 14) to produce fiber-reinforced elastic products.

The results are shown in Tables 9 and 10.

TABLE 5

| | Fiber-reinforced rubber composition | | | | | | |
|---|---|---|---|---|---|---|---|
| | | | | | Nylon component | | |
| | | | | | | Shape of fiber | |
| Sample No. | Weight ratio of each component | | | Graft ratio (wt %) | Shape | Average diameter of fiber (μm) | Fiber[2] length (μm) |
| | NR | 6-Nylon | G-1[1] | | | | |
| 19 | 100 | 30 | 1.0 | 13 | Fine fiber | 0.2 | ≧15 |
| 20 | 100 | 30 | 0 | 0 | Thicker fiber Filmy product | 5 | >50 |
| 21 | 100 | 50 | 1.0 | 13 | Fine fiber | 0.2 | ≧15 |

[1] N-(3-methacryloyloxy-2-hydroxypropyl)-N'-phenyl-p-phenylenediamine
[2] For instance, ≧15 means that the shortest fiber length was 15 μm.

TABLE 6

| Example (Ex.) and Comparative Example (Com. Ex.) Nos. | | Ex. 14 | Com. Ex. 6 | Ex. 15 | Ex. 16 | Ex. 17 | Ex. 18 | Ex. 19 | Ex. 20 | Com. Ex. 7 |
|---|---|---|---|---|---|---|---|---|---|---|
| Sample No. | | 19 | 20 | 21 | 21 | 21 | 21 | 21 | 21 | |
| Amount (part) | | 28.1 | 27.7 | 19.5 | 6.0 | 12.2 | 24.3 | 30.4 | 45.6 | 0 |
| NR (part) | | 78.7 | 78.7 | 87.2 | 96.0 | 92.0 | 84.0 | 80.0 | 70.0 | 100 |
| Compound to be vulcanized | | | | | | | | | | |
| Carbon black (ISAF)[1] | (part) | 50 | | | | | | | | |
| Process oil[2] | (") | 5 | | | | | | | | |
| Zinc oxide | (") | 5 | | | | | | | | |
| Stearic acid | (") | 3 | | | | | | | | |
| 810 NA[3] | (") | 1.2 | " | " | " | " | " | " | " | " |
| #224[4] | (") | 0.8 | | | | | | | | |
| DM[5] | (") | 0.6 | | | | | | | | |
| M[6] | (") | 0.2 | | | | | | | | |
| Sulfur | (") | 2.5 | | | | | | | | |
| Ratio of nylon to rubber content | (PHR) | 6.4 | 6.4[9] | 6.4 | 2.0 | 4.0 | 8.0 | 10.0 | 15.0 | 0 |
| Reinforced elastic product | | | | | | | | | | |
| 50% Modulus | (kg/cm²) | 55 | 80 | 67 | 33 | 49 | 80 | 87 | 106 | 19 |
| 100% Modulus | (") | 83 | 91 | 96 | 55 | 75 | 114 | 126 | 153 | 35 |
| 200% Modulus | (") | 138 | 123 | 152 | 114 | 135 | 175 | 189 | 218 | 92 |
| 300% Modulus | (") | 204 | 181 | 220 | 189 | 230 | 249 | 260 | — | 166 |
| Tensile break strength | (") | 285 | 240 | 286 | 310 | 310 | 292 | 266 | 255 | 284 |
| Elongation | (%) | 419 | 380 | 400 | 440 | 410 | 360 | 310 | 266 | 440 |
| Peeling strength[7] | (kg) | >50 | 9 | >50 | >50 | >50 | >50 | >50 | >50 | >50 | pounding ratios of carbon black were changed as shown

TABLE 7

| Example (Ex.) No. and Comparative Example (Com. Ex.) No. | | Com. Ex. 8 | Ex. 21 | Com. Ex. 9 | Ex. 22 | Com. Ex. 10 | Ex. 23 | Com. Ex.11 | Ex. 24 |
|---|---|---|---|---|---|---|---|---|---|
| Reinforced rubber composition | Sample No. | — | 21 | — | 21 | — | 21 | — | 21 |
| | Amount (part) | 0 | 19.7 | 0 | 19.7 | 0 | 19.7 | 0 | 19.7 |

TABLE 7-continued

| Example (Ex.) No. and Comparative Example (Com. Ex.) No. | | Com. Ex. 8 | Ex. 21 | Com. Ex. 9 | Ex. 22 | Com. Ex. 10 | Ex. 23 | Com. Ex.11 | Ex. 24 |
|---|---|---|---|---|---|---|---|---|---|
| NR (part) | | 100 | 87.2 | 100 | 87.2 | | 87.2 | | 87.2 |
| Carbon black (ISAF)[1] | (part) | 30 | 30 | 40 | 40 | 60 | 60 | 70 | 70 |
| Process oil[2] | (") | 5 | " | " | " | " | " | " | " |
| Zinc oxid | (") | 5 | | | | | | | |
| Stearic acid | (") | 3 | | | | | | | |
| 810 NA[3] | (") | 1.2 | | | | | | | |
| #224[4] | (") | 0.8 | | | | | | | |
| DM[5] | (") | 0.6 | | | | | | | |
| M[6] | (") | 0.2 | | | | | | | |
| Sulfur | (") | 2.5 | | | | | | | |
| Ratio of nylon fiber to rubber content | (PHR) | 0 | 6.4 | 0 | 6.4 | 0 | 6.4 | 0 | 6.4 |
| 50% Modulus | (kg/cm$^2$) | 12 | 59 | 16 | 62 | 24 | 83 | 30 | 94 |
| 100% Modulus | (") | 21 | 85 | 27 | 91 | 43 | 118 | 55 | 129 |
| 200% Modulus | (") | 53 | 128 | 69 | 147 | 108 | 184 | 131 | 198 |
| 300% Modulus | (") | 104 | 191 | 132 | 220 | 184 | 256 | 213 | 322 |
| Tensile break strength | (") | 277 | 280 | 291 | 285 | 299 | 312 | 297 | 280 |
| Elongation | (%) | 510 | 410 | 480 | 370 | 430 | 380 | 410 | 320 |
| Peeling strength | (kg) | >50 | >50 | >50 | >50 | >50 | >50 | >50 | >50 |

[1] Diablack I manufactured by Mitsubishi Chemical Industries Ltd.
[2] Aromatic oil manufacture by Toa Nenryo Kogyo K.K.
[3] N-phenyl-N'-isopropyl-p-phenylenediamine
[4] 2,2,4-trimethyl-1,2-dihydroquinoline polymer (Nocroc 224 manufactured by Ouchi-Shinko Chemical Industry Co., Ltd.)
[5] Dibenzothiazyl disulfide (Nocceler DM, manufactured by OuchiShinko Chemical Industry Co., Ltd.)
[6] Mercaptobenzothiazole
[7] This strength exhibits adhesion properties to vulcanized natural rubber
[8] Total amounts of nylon fiber and nylon in the form of film.

TABLE 8

| Example (Ex.) and Comparative Example (Com. Ex.) Nos. | Ex. 14 | Ex. 15 | Ex. 16 | Ex. 17 | Ex. 18 | Ex. 19 | Ex. 20 | Com. Ex. 6 | Com. Ex. 7 | Ex. 21 | Com. Ex. 8 | Ex. 22 | Com. Ex. 9 | Ex. 23 | Com. Ex. 10 | Ex. 24 |
|---|---|---|---|---|---|---|---|---|---|---|---|---|---|---|---|---|
| Mooney viscosity of compound to be vulcanized $ML_{1+4}$ (100° C.) | 83.2 | 83.0 | 83.5 | 82.5 | 83.0 | 84.5 | 80.0 | 81.0 | 62.0 | 64.0 | 75.0 | 71.0 | 102 | 101 | 125 | 127 |

TABLE 9

| | | Com. Ex. 11 | Ex. 25 | Com. Ex. 12 | Ex. 26 | Com. Ex. 13 | Ex. 27 | Com. Ex. 14 | Ex. 28 | Com. Ex. 15 | Ex. 29 | Com. Ex. 16 | Ex. 30 |
|---|---|---|---|---|---|---|---|---|---|---|---|---|---|
| Reinforced rubber composition (sample 21) | (part) | — | 19.7 | — | 19.7 | — | 19.7 | — | 19.7 | — | 19.7 | — | 19.7 |
| NR | (part) | 60 | 47.2 | 100 | 87.2 | 80 | 67.2 | 95 | 82.2 | 50 | 37.2 | 70 | 57.2 |
| BR 1) | (part) | 40 | 40 | — | — | — | — | 5 | 5 | 50 | 50 | — | — |
| SBR 2) | (part) | — | — | — | — | 20 | 20 | — | — | — | — | 30 | 30 |
| Carbon black (HAF) 10) | (part) | 50 | 50 | 50 | 50 | 60 | 60 | 55 | 55 | 65 | 65 | — | — |
| Silica 3) | (part) | — | — | — | — | — | — | — | — | — | — | 60 | 60 |
| Aromatic oil 4) | (part) | 15 | 15 | 5 | 5 | 5 | 5 | — | — | 5 | 5 | — | — |
| Spindle oil 5) | (part) | — | — | — | — | — | — | 10 | 10 | — | — | 10 | 10 |
| Stearic acid | (part) | 2 | 2 | 2 | 2 | 2 | 2 | 2 | 2 | 2 | 2 | 2 | 2 |
| Zinc oxide | (part) | 3.5 | 3.5 | 3.5 | 3.5 | 5 | 5 | 4 | 4 | 5 | 5 | 5 | 5 |
| 810 NA | (part) | 1.8 | 1.8 | — | — | — | — | 1 9) | 1 9) | 1 | 1 | — | — |
| CZ 6) | (part) | — | — | — | — | — | — | — | — | — | — | 0.8 | 0.8 |
| NObS 7) | (part) | 0.7 | 0.7 | 0.5 | 0.5 | 0.8 | 0.8 | 0.8 | 0.8 | 0.8 | 0.8 | — | — |
| DM | (part) | 0.3 | 0.3 | — | — | 0.3 | 0.3 | — | — | 0.4 | 0.4 | — | — |
| Sulfur | (part) | 1.5 | 1.5 | 1.5 | 1.5 | 5.5 | 5.5 | 2 | 2 | 2.5 | 2.5 | 2.5 | 2.5 |
| Tackifier 8) | (part) | — | — | — | — | — | — | — | — | 0.5 | 0.5 | — | — |
| Ratio of nylon fiber to rubber content (PHR) | | 0 | 6.4 | 0 | 6.4 | 0 | 6.4 | 0 | 6.4 | 0 | 6.4 | 0 | 6.4 |
| Intended application of compounded composition | | Sidewall | Sidewall | Tread base rubber | Tread base rubber | Bead | Bead | Tire cord coating rubber | Tire cord coating rubber | | | White compound | White compound |

TABLE 10

| | | Com. Ex. 11 | Ex. 25 | Com. Ex. 12 | Ex. 26 | Com. Ex. 13 | Ex. 27 | Com. Ex. 14 | Ex. 28 | Com. Ex. 15 | Ex. 29 | Com. Ex. 16 | Ex. 30 |
|---|---|---|---|---|---|---|---|---|---|---|---|---|---|
| 50% Modulus | (kg/cm$^2$) | 12 | 44 | 16 | 65 | 51 | 120 | 21 | 64 | 31 | 84 | 9 | 55 |

TABLE 10-continued

| | | Com. Ex. 11 | Ex. 25 | Com. Ex. 12 | Ex. 26 | Com. Ex. 13 | Ex. 27 | Com. Ex. 14 | Ex. 28 | Com. Ex. 15 | Ex. 29 | Com. Ex. 16 | Ex. 30 |
|---|---|---|---|---|---|---|---|---|---|---|---|---|---|
| 100% Modulus | (kg/cm$^2$) | 22 | 66 | 31 | 94 | 99 | 187 | 40 | 99 | 56 | 121 | 11 | 64 |
| 200% Modulus | (kg/cm$^2$) | 54 | 108 | 85 | 159 | — | — | 99 | 168 | 135 | 194 | 15 | 88 |
| 300% Modulus | (kg/cm$^2$) | 99 | 159 | 159 | 236 | — | — | 174 | 245 | — | — | 25 | 119 |
| Tensile break strength | (kg/cm$^2$) | 240 | 238 | 281 | 282 | 182 | 202 | 271 | 264 | 222 | 220 | 134 | 144 |
| Elongation | (%) | 540 | 450 | 460 | 370 | 170 | 120 | 420 | 340 | 300 | 250 | 830 | 390 |
| Peeling strength | (kg) | >50 | >50 | — | >50 | — | >50 | — | >50 | — | >50 | — | >50 |

1): Polybutadiene (UBEPOL-BR100, Ube Industries, Ltd.)
2): Styrene-butadiene copolymer rubber (SBR 1500 Japan Synthetic Rubber Co., Ltd.)
3): Silica (Nipsil VN3, Nippon Silica Co.)
4): Aromatic oil (H-1, Toa Nenryo Kogyo K.K.)
5): Spindle oil (White, Maruzen Oil Co., Ltd.)
6): Cyclohexyl-benzothiazyl-sulfeneamide (Nocceler CZ, Ouchi-Shinko Chemical Industory Co., Ltd.)
7): N-oxydiethylene-2-benzothiazole sulfeneamide (Soxinol NBS, Sumitomo Chemical Co., Ltd.)
8): Alkylphenyl-formaldehyde resin (Tackirol 101, Sumitome Chemical Co., Ltd.)
9): 4,4'-thiobis (6-tert-butyl-3-methylphenyl) (Nocrac 300, Ouchi-Shinko Chemical Industry Co., Ltd.)
10): Carbon black (HAF) (Diablack H, Mitsubishi Chemical Co., Ltd.)

The following starting materials were used in the following examples:

A. Novolak type phenol-formaldehyde resin precondensate (which is referred to as "novolak A") manufactured by Meiwa plastic Industries Ltd. (Trade name: 550PL) which was prepared by condensing phenol and paraformaldehyde in the presence of, as a catalyst, oxalic acid and which was in the form of a powder crystal having a softening point of 106° C., a water content of 0.12% and a free phenol content of 0.13%.

B. Novolak type lactum-bisphenol F-formaldehyde resin precondensate (which is referred to as "novolak B")

This precondensate was prepared as follows: One hundred and forty one parts of ε-caprolactam and 55.6 parts of paraformaldehyde having a purity of 81% were allowed to react at a temperature of 120° C. for 5 hours to obtain an addition reaction solution containing the addition reaction product of ε-caprolactum and formaldehyde. The total amount of the addition reaction solution was gradually and dropwise added to a mixture of 315 parts of bisphenol F, 32 parts of water, and 1.6 parts of 35% hydrochloric acid, and the addition product of ε-caprolactum and formaldehyde and bisphenol F was subjected to a condensation reaction. Then, the reaction mixture was distilled at a temperature of 180° C. under a reduced pressure (10 mmHg). Thus, 469 parts of the desired novolak type lactum-bisphenol F-formaldehyde precondensate was obtained.

C. Novolak type styrenated phenol-phenol-formaldehyde resin precondensate (which is referred to as "novolak C")

This precondensate was prepared as follows:

One thousand and forty one parts of styrene was gradually and dropwise added to a mixture of 1412 parts of phenol and 40.3 parts of 35% hydrochloric acid and, then, the mixture was mixed at a temperature of 130° C. for 2 hours to obtain styrenated phenol. The styrenated phenol was recovered from the reaction mixture by a vacuum distillation under the conditions of 180° C. and 40 mmHg. To the total amount of the styrenated phenol thus obtained, 1426 parts of formalin and 87 parts of a 40% aqueous sodium hydroxide solution were added and the mixture was mixed at a temperature of 80° C. for 5 hours to effect addition of the formaldehyde to the styrenated phenol (i.e., the methylol styrenated phenol was formed). To the total amount of the addition product thus obtained, 1653 parts of phenol and 123 parts of oxalic acid were added. Thus, a condensation reaction of the methylol styrenated phenol and phenol was effected at a temperature of 100° C. for 2 hours. 2959 parts of the desired styrenated phenol-phenol-formaldehyde resin precondensate having a softening point (according to a ring and ball method) of 73° C. was recovered from the reaction mixture by a vacuum distillation method under the conditions of 100° C. to 180° C. and 40 mmHg.

EXAMPLE 31

One hundred parts of NR used in Example 1 and 1.0 part of N-(3-methacryloyloxy-2-hydroxypropyl)-N'-phenyl-p-phenylene diamine used in Example 3 were charged into a Brabender Plastograph (220° C., 50 rpm) and were masticated for 30 seconds. Then, 50 parts of 6-nylon used in Example 1 was charged into the Brabender Plastograph and the mixture was mixed for 4.5 minutes. Thereafter, 2.25 parts of novolak A was charged and the mixture was mixed for 3 minutes and 0.225 parts of hexamethylenetetramine was charged and the mixture was further mixed for 3.5 minutes during which the temperature of the content in the Brabender Plastograph was increased to 230° C. Thus, the mixture was obtained.

The resultant mixture was extruded at a die temperature of 235° C. into a strand having a diameter of about 2 mm by using the extruder used in Example 1. The strand was wound on a bobbin through the funnel used in Example 1 at a draft ratio of 9 and a winding rate of 35 m/min in the manner similar to that in Example 1. The wound strand was vacuum dried at a room temperature for one day to remove the attached water therefrom. About 500 of the wound strands were then bundled to a sheet having a thickness of about 2 mm and a width of about 150 mm. The sheet was rolled by using a pair of pressure rolls having a roll nip of 0.2 mm and a temperature of 60° C. Thus, the sheet was rolled by about ten times of the original length to obtain the desired fiber-reinforced rubber composition (i.e., masterbatch).

The graft ratio of the resultant fiber-reinforced rubber composition was determined in the same manner as used in Example 1. The result is shown in Table 11. Furthermore, the shape of the nylon fiber contained in the composition was observed in the same manner as in Example 1. The fiber was extremely fine fiber having a circular cross-section. The results are shown in Table 11.

The fiber-reinforced rubber composition obtained above was vulcanized at a temperature of 150° C. for a period of 40 minutes according to the formulation as shown in Table 12 below. The results are shown in Table 12.

EXAMPLE 32

A fiber-reinforced rubber composition was prepared in the same manner as in Example 31, except that 30 parts of the 6-nylon, 1.93 parts of novolak A, and 0.193 parts of hexamethylene tetramine were used.

The results are shown in Tables 11 and 12.

EXAMPLE 33

A fiber-reinforced rubber composition was prepared in the same manner as in Example 31, except that 40 parts of the 6-nylon, 2.10 parts of novolak A, and 0.21 parts of hexamethylene tetramine were used.

The results are shown in Tables 11 and 12.

EXAMPLE 34

A fiber reinforced rubber composition was prepared in the same manner as in Example 31, except that 70 parts of the 6-nylon, 2.55 parts of novolak A, and 0.255 parts of hexamethylene tetramine were used.

The results are shown in Tables 11 and 12.

EXAMPLE 35

A fiber-reinforced rubber composition was prepared in the same manner as in Example 31, except that 0.75 parts of novolak A and 0.075 parts of hexamethylene tetramine were used.

The results are shown in Tables 11 and 12.

EXAMPLE 36

A fiber-reinforced rubber composition was prepared in the same manner as in Example 31, except that 1.88 parts of novolak A and 0.188 parts of hexamethylene tetramine were used.

The results are shown in Tables 11 and 12.

COMPARATIVE EXAMPLE 17

A rubber composition was prepared in the same manner as in Example 31, except that novolak A and hexamethylene tetramine were not added.

The results are shown in Tables 11 and 12.

EXAMPLE 37

A fiber-reinforced rubber composition was prepared in the same manner as in Example 31, except that novolak B was used in lieu of novolak A.

The results are shown in Tables 11 and 12.

EXAMPLE 38

A fiber-reinforced rubber composition was prepared in the same manner as in Example 31, except that novolak C was used in lieu of novolak A.

The results are shown in Tables 11 and 12.

EXAMPLE 39

A fiber-reinforced rubber composition was prepared in the same manner as in Example 31, except that 0.255 parts of alpha-polyoxymethylene (n>100, manufactured by Katayama Chemical Industries Co.) was used in lieu of hexamethylene tetramine.

The results are shown in Tables 11 and 12.

EXAMPLE 40

One hundred parts of NR used in Example 1 and 1 part of Nocrac G-1 were charged into a Brabender Plastograph (220° C., 50 rpm) and was masticated for 30 seconds. Then, 50 parts of 6-nylon used in Example 1 was charged and the mixture was mixed for 4 minutes. Thereafter, 0.75 parts of novolak A was charged, followed by mixing for 1 minute and, then, 0.075 parts of hexamethylene tetramine was charged, followed by mixing for 2 minutes (during the mixing, the temperature of the content in the Brabender Plastograph was increased to 230° C.).

Furthermore, 0.75 parts of novolak A was charged, followed by mixing for 1 minute and, then, 0.075 parts of hexamethylene tetramine was charged, followed by mixing for 2 minutes (during the mixing, the temperature of the content in the Brabender Plastograph was increased to 230° C.).

Thereafter, 0.75 parts of novolak A was again charged, followed by mixing for 1 minute and, then, 0.075 parts of hexamethylene tetramine was charged, followed by mixing for 2 minutes (during the mixing, the temperature of the content in the Brabender Plastograph was increased to 230° C.).

The resultant mixture thus obtained was extruded, wound and rolled in the same manner as in Example 31 to obtain a fiber-reinforced rubber composition.

The results are shown in Tables 11 and 12.

EXAMPLE 41

One hundred parts of NR used in Example 1 and 1 part of Nocrac G-1 were charged into a Bunbury mixer (manufactured by Minamisenju MFG Co., Ltd.) operated at 150° C. and 150 rpm and was masticated for 1 minute. Then, 50 parts of the 6-nylon used in Example 1 was charged, followed by mixing for 4 minutes. During this mixing, the temperature of the content in the mixer was increased to 230° C. and 6-nylon was melted. Thereafter, 2.25 parts of novolak A was charged, followed by mixing for 7 minutes and, then, 0.225 parts of hexamethylene tetramine was charged, followed by mixing for 2.5 minutes (during the mixing, the temperature of the content in the Banbury mixer was increased to 230° C.).

The resultant mixture thus obtained was extruded, wound and rolled in the same manner as in Example 31 to obtain a fiber-reinforced rubber composition.

The results are shown in Tables 11 and 12. During six continuous hours of extrusion and winding operations, no break of the extrudate was caused.

The length of the nylon fiber buried in the fiber-reinforced rubber composition of each Example was not more than about 200 $\mu$m (by calculation).

TABLE 11

| | NR | 6-Nylon (1030B) Amount | Novolak Kind | Novolak Amount | Formaldehyde Producing compound Kind | Formaldehyde Producing compound Amount | Nocrac G-1 | Number of break during 30 min. continuous winding of extrudate (times) | Graft ratio (%) | Shape of nylon | Average fiber diameter (m) | Fiber length* (m) |
|---|---|---|---|---|---|---|---|---|---|---|---|---|
| Example 31 | 100 | 50 | Novolak A | 2.25 | Hexamethylene tetramine | 0.225 | 1.0 | 0 | 8 | Fine short fiber | 0.2 | ≧15 |
| Example 32 | 100 | 30 | Novolak A | 1.93 | Hexamethylene tetramine | 0.193 | 1.0 | 0 | 7 | Fine short fiber | 0.2 | ≧15 |
| Example 33 | 100 | 40 | Novolak A | 2.10 | Hexamethylene tetramine | 0.21 | 1.0 | 0 | 7 | Fine short fiber | 0.2 | ≧15 |
| Example 34 | 100 | 70 | Novolak A | 2.55 | Hexamethylene tetramine | 0.255 | 1.0 | 0 | 10 | Fine short fiber | 0.3 | ≧20 |
| Example 35 | 100 | 50 | Novolak A | 0.75 | Hexamethylene tetramine | 0.075 | 1.0 | 0 | 8 | Fine short fiber | 0.3 | ≧20 |
| Example 36 | 100 | 50 | Novolak A | 1.88 | Hexamethylene tetramine | 0.188 | 1.0 | 0 | 10 | Fine short fiber | 0.2 | ≧15 |
| Comparative Example 17 | 100 | 50 | — | | — | | 1.0 | 18 | 0 | Thick fiber & large amount of film | 5 | — |
| Example 37 | 100 | 50 | Novolak B | 2.25 | Hexamethylene tetramine | 0.225 | 1.0 | 0 | 8 | Fine short fiber | 0.2 | ≧15 |
| Example 38 | 100 | 50 | Novolak C | 2.25 | Hexamethylene tetramine | 0.225 | 1.0 | 0 | 8 | Fine short fiber | 0.2 | ≧15 |
| Example 39 | 100 | 50 | Novolak A | 2.25 | -Polyoxymethylene | 0.225 | 1.0 | 0 | 9 | Fine short fiber | 0.2 | ≧15 |
| Example 40 | 100 | 50 | Novolak A | 2.25* | Hexamethylene tetramine | 0.225* | 1.0 | 0 | 12 | Fine short fiber | 0.2 | ≧15 |
| Example 41 | 100 | 50 | Novolak A | 2.25 | Hexamethylene tetramine | 0.225 | 1.0 | (0) | 15 | Fine short fiber | 0.1 | ≧10 |

TABLE 12

| Example No. | | 31 | 32 | 33 | 34 | 35 | 36 | 17* | 37 | 38 |
|---|---|---|---|---|---|---|---|---|---|---|
| Amount of reinforced rubber composition | (part) | 19.6 | 28.4 | 22.9 | 15.9 | 19.4 | 19.6 | 19.3 | 19.6 | 19.6 |
| Amount of NR | (") | 87.2 | 78.7 | 85.9 | 90.9 | 87.2 | 87.2 | 87.2 | 87.2 | 87.2 |
| Carbon black[1] | (") | 50 | | | | | | 50 | | |
| Process oil | (") | 5 | | | | | | 5 | | |
| Zinc oxide | (") | 5 | | | | | | 5 | | |
| Stearic acid | (") | 3 | | | | | | 3 | | |
| 810 NA.[2] | (") | 1.2 | " | " | " | " | " | 1.2 | " | " |
| #224[3] | (") | 0.8 | | | | | | 0.8 | | |
| DM[4] | (") | 0.6 | | | | | | 0.6 | | |
| D[5] | (") | 0.2 | | | | | | 0.2 | | |
| Sulfur | (") | 2.5 | | | | | | 2.5 | | |
| Ratio of nylon fiber to total rubber | (PHR) | 6.4 | 6.4 | 6.4 | 6.4 | 6.4 | 6.4 | 6.4[7] | 6.4 | 6.4 |
| 50% modulus | (kg/cm²) | 84 | 77 | 83 | 88 | 91 | 82 | 80 | 78 | 72 |
| 100% modulus | (kg/cm²) | 112 | 107 | 115 | 122 | 122 | 113 | 95 | 110 | 104 |
| 200% modulus | (kg/cm²) | 168 | 168 | 167 | 181 | 173 | 170 | 131 | 169 | 163 |
| 300% modulus | (kg/cm²) | 243 | 240 | 235 | 253 | 243 | 243 | 190 | 238 | 238 |
| Tensile break strength | (kg/cm²) | 311 | 299 | 305 | 294 | 300 | 295 | 240 | 293 | 306 |
| Elongation | (%) | 398 | 381 | 390 | 363 | 382 | 375 | 380 | 379 | 392 |
| Peeling strength[6] | (kg) | >50 | >50 | >50 | >50 | >50 | >50 | 10 | >50 | >50 |
| Overall evaluation | | Good | Good | Good | Good | Good | Good | Poor | Good | Good |

| Example No. | | 39 | 40 | 41 | Reference Example 1* |
|---|---|---|---|---|---|
| Amount of reinforced rubber composition | (part) | 19.6 | 19.6 | 19.6 | 0 |
| Amount of NR | (") | 87.2 | 87.2 | 87.2 | 100 |
| Carbon black[1] | (") | | | | |
| Process oil | (") | | | | |

TABLE 12-continued

| | | | | | |
|---|---|---|---|---|---|
| Zinc oxide | ('') | | | | |
| Stearic acid | ('') | | | | |
| 810 NA.[2] | ('') | '' | '' | '' | '' |
| #224[3] | ('') | | | | |
| DM[4] | ('') | | | | |
| D[5] | ('') | | | | |
| Sulfur | ('') | | | | |
| Ratio of nylon fiber to total rubber | (PHR) | 6.4 | 6.4 | 6.4 | 0 |
| 50% modulus | (kg/cm$^2$) | 93 | 76 | 77 | 17 |
| 100% modulus | (kg/cm$^2$) | 123 | 108 | 110 | 31 |
| 200% modulus | (kg/cm$^2$) | 179 | 169 | 172 | 81 |
| 300% modulus | (kg/cm$^2$) | 250 | 243 | 249 | 147 |
| Tensile break strength | (kg/cm$^2$) | 314 | 295 | 298 | 283 |
| Elongation | (%) | 392 | 390 | 390 | 479 |
| Peeling strength[6] | (kg) | >50 | >50 | >50 | >50 |
| Overall evaluation | | Good | Good | Good | Fairly good |

*Comparative Example
[1] Diablack I manufactured by Mitsubishi Chemical Industries Ltd.
[2] N-phenyl-N'-isopropyl-p-phenylenediamine manufactured by Ouchi-Shinko Chemical Industory Co., Ltd.
[3] 2,2,4-trimethyl-1,2-dihydroquinoline polymer (Nocrac 224 manufactured by Ouchi-shinko Chemical Industory Co., Ltd.)
[4] Dibenzothiazyl disulfide manufactured by Ouchi-Shinko Chemical Industory Co., Ltd.
[5] N,N'-diphenylguanidine manufactured by Ouchi-Shinko Chemical Industory Co., Ltd.
[6] This strength exhibits adhesion properties to vulcanized natural rubber
[7] Total amounts of nylon fiber and nylon in the form of film.

The vulcanizates obtained from the fiber-reinforced rubber compositions of Examples 31 to 41 exhibited smooth "reverse S type" stress-strain curves. Contrary to this, the vulcanizate obtained from Comparative Example 17 exhibited stress-strain curves having undulation turbulence from the point at a strain of around 50%.

Vulcanizates were obtained from the fiber-reinforced rubber composition of Examples 31, 37, and 38, and Comparative Example 17. The physical properties of the vulcanizates thus obtained were determined. A PICO abrasion test of the vulcanizates was carried out according to a ASTM-D-2228 method.

A fatigue test was carried out in air at a temperature of 100° C. by using a constant load tensile fatigue test machine (Model S6T manufactured by Toyo Seiki Seisakusho Ltd.,). A 50% modulus retention rate (%) and tensile break strength retention rate (%) [i.e., values after fatigue test/values before fatigue test)×100] after the samples were subjected to 1×10$^4$ times tensile test under a load of 30 Kg/cm$^2$ were determined. The times (i.e., fatigue life) by which the samples were broken by the repeated tension were determined under a constant load of 50 Kg/cm$^2$.

The results are shown in Table 13 below.

The results shown in Table 13 clearly exhibit that the fiber-reinforced rubber compositions of the present invention can provide the vulcanizates having an excellent properties under a high temperature and high stress.

EXAMPLE 42

One hundred parts of NR used in Example 1 and 1.0 part of N-(3-methacryloyloxy-2-hydroxypropyl)-N'-phenyl-p-phenylenediamine used in Example 3 were charged into a Bunbury mixer (manufactured by Minamisenju MFG. Co., Ltd.) set at 150° C. and 150 rpm and was masticated for 1 minute. Then, 50 part of the 6-nylon used in Example 1 was charged into the Bunbury mixer, followed by mixing for 4 minutes. During this mixing, the temperature of the content in the mixer was increased to 230° C. and the 6-nylon was melted. Thereafter, 2.25 parts of novolak A was charged into the mixer, followed by mixing for 7 minutes and, then, 0.225 parts of hexamethylene tetramine was charged into the mixer, followed by mixing for 2.5 minutes (during this mixing, the temperature of the content in the mixer was increased to 230° C.) to effect the graft reaction. The content was then dumped from the Banbury mixer.

TABLE 13

| Example No. | | Example 3 | Example 3 | Example 3 | Comparative Example 17 |
|---|---|---|---|---|---|
| Hardness | (degree) | 76 | 76 | 75 | 75 |
| Tear strength[a] | (kg/cm) | 98 | 96 | 91 | 48 |
| Flexing resistance[b] | | | | | |
| crack initiation | (times) | 70000 | 72000 | 68000 | 25000 |
| crack growth | (times) | 123000 | 10000 | 11000 | 7000 |
| Impact resilience[b] | (%) | 47 | 46 | 46 | 48 |
| PICO abrasion index[b] | | 196 | 190 | 188 | 101 |
| 50% modulus retention rate | (%) | 100 | 96 | 91 | 90 |
| Fatigue test[a] | | | | | |
| Tensile break strength retention rate | (%) | 90 | 97 | 88 | 84 |
| Fatigue life | (times) | 11000 | 10500 | 9400 | 1300 |

[a] Vulcanization period = 40 minutes
[b] Vulcanization period = 30 minutes

The mixture thus obtained was extruded into a strand in the same manner as in Example 31. The wound strand was vacuum dried and was bundled in the same manner as in Example 31 to form a sheet having a thickness of about 2 mm and a width of about 150 mm. The sheet was rooled in the same manner as in Example 31 to obtain a fiber-reinforced rubber composition (sample 22).

The graft ratio of the resultant fiber-reinforced rubber composition was determined in the same manner as used in Example 1. The result is shown in Table 14. Furthermore, the shape of the nylon fiber contained in the composition was observed by the scanning electron microscope in the same manner as in Example 1. The fiber was extremely fine fiber having a circular cross-section. The results are shown in Table 14.

The fiber-reinforced rubber composition obtained above was mixed with compounding agents listed in Table 15, except for sulfur and a vulcanization accelerator in a Brabender Plastograph set at 80° C. and 77 rpm. Then, the resultant mixture was mixed with sulfur and the vulcanization accelerator on 3 inch open rolls at a temperature of 80° C. and was sheeted from the rolls. The sheet thus obtained was placed and was vulcanized in a mold to obtain a vulcanizate. The vulcanization conditions were as follows:
1) 150° C.×40 min. for tensile test
2) 150° C.×30 min. for peeling test.

COMPARATIVE EXAMPLE 18

A fiber-reinforced rubber composition (sample 23) was prepared in the same manner as in Example 42, except that novolak A and hexamethylene tetramine were not charged. The resultant rubber composition contained a large amount of nylon filmy products therein.

The results are shown in Tables 14 and 15.

EXAMPLE 43

A fiber-reinforced rubber composition (sample 24) was prepared in the same manner as in Example 42, except that novolak B was used in lieu of novolak A. From the resultant rubber composition, a fiber-reinforced elastic product was obtained in the same manner as in Example 42.

The results are shown in Tables 14 and 15.

EXAMPLE 44

A fiber reinforced rubber composition (sample 25) was prepared in the same manner as in Example 42, except that novolak C was used in lieu of novolak A. From the resultant rubber composition, a fiber-reinforced elastic product was obtained in the same manner as in Example 42.

The results are shown in Tables 14 and 15.

REFERENCE EXAMPLE 1

A elastic product of NR was prepared in the same manner as in Example 42, except that no fiber-reinforced rubber composition was used.

The results are shown in Table 15.

TABLE 14

| | Fiber-reinforced rubber composition | | | | | | | Nylon component | |
|---|---|---|---|---|---|---|---|---|---|
| | Ratio of each component (wt ratio) | | | | | Graft | | Average fiber | Shortest fiber |
| Sample No. | NR | 6-Nylon | Novolak | Hexa-methylene tetramine | Nocrac G-1 | ratio (%) | Shape | diameter ($\mu$m) | length ($\mu$m) |
| 22 | 100 | 50 | 2.25[1] | 0.225 | 1.0 | 15 | Fine short fiber having circular cross-section | 0.1 | $\geq 10^{[4]}$ |
| 23 | 100 | 50 | 0 | 0 | 1.0 | 0 | Thick fiber + large amount of film | 5 | >50 |
| 24 | 100 | 50 | 2.25[2] | 0.225 | 1.0 | 13 | Fine short fiber having circular cross-section | 0.1 | $\geq 10^{[4]}$ |
| 25 | 100 | 50 | 2.25[3] | 0.225 | 1.0 | 14 | Fine short fiber having circular cross-section | 0.1 | $\geq 10^{[4]}$ |

[1]Novolak A,
[2]Novolak B,
[3]Novolak C
[4]Fiber lengths of nylon buried in the composition were not more than about 200 $\mu$m (from calculation).

TABLE 15

| | | | | Example No. | | | | |
|---|---|---|---|---|---|---|---|---|
| | | | | Example 42 | Comparative Example 18 | Example 43 | Example 44 | Reference Example 1 |
| | Sample No. | | | 22 | 23 | 24 | 25 | — |
| | Amount of sample | | (part) | 19.6 | 19.6 | 19.6 | 19.6 | 0 |
| | Amount of NR | | (part) | 87.2 | 87.2 | 87.2 | 87.2 | 100 |
| Compound | Carbon black (ISAF) | 1) | (part) | 50 | | | | |
| to be | Process oil | 2) | (part) | 5 | | | | |
| vulcanized | Zinc oxide | | (part) | 5 | " | " | " | " |
| | Stearic acid | | (part) | 3 | | | | |
| | 810 NA | 3) | (part) | 1.2 | | | | |
| | # 224 | 4) | (part) | 0.8 | | | | |

TABLE 15-continued

|  |  |  |  | Example 42 | Comparative Example 18 | Example 43 | Example 44 | Reference Example 1 |
|---|---|---|---|---|---|---|---|---|
|  | DM | 5) | (part) | 0.6 | | | | |
|  | D | 6) | (part) | 0.2 | | | | |
|  | Sulfur | | (part) | 2.5 | | | | |
|  | Ratio of nylon fiber to rubber content | | (PHR) | 6.4 | 6.4 8) | 6.4 | 6.4 | 0 |
| Reinforced elastic product | 50% Modulus | | (kg/cm$^2$) | 77 | 80 | 74 | 69 | 17 |
|  | 100% Modulus | | (kg/cm$^2$) | 110 | 95 | 108 | 102 | 31 |
|  | 200% Modulus | | (kg/cm$^2$) | 172 | 131 | 169 | 163 | 81 |
|  | 300% Modulus | | (kg/cm$^2$) | 249 | 190 | 245 | 239 | 147 |
|  | Tensile break strength | | (kg/cm$^2$) | 298 | 240 | 296 | 299 | 283 |
|  | Elongation | | (%) | 390 | 380 | 390 | 390 | 480 |
|  | Peeling strength | 7) | (kg) | >50 | 10 | >50 | >50 | >50 |

[Remarks]
1) Diablack I, Mitsubishi Chemical Industries Ltd.
2) Aromatic oil, Toa Nenryo Kogyo K.K
3) N-phenyl-N'-isopropyl-p-phenylenediamine
4) 2,2,4-trimethyl-1,2-dihydroquinoline polymer (Nocrac 224, Ouchi-Shinko Chemical Industry Co., Ltd.)
5) Dibenzothiazyl sulfide (Noccelar DM, Ouchi-Shinko Chemical Industory Co., Ltd.)
6) N,N'-diphenylguanidine
7) This strength exhibits adhesion properties to vulcanized natural rubber.
8) Total amounts of nylon fiber and nylon filmy product

EXAMPLES 45 TO 48 AND REFERENCE EXAMPLES 2 TO 5

Elastic products were prepared in the same manner as in Example 42 or Reference Example 1, except that the compounding amounts of carbon black were changed. The results are shown in Table 16.

(Reference Example 6). The compounding components, other than sulfur and the vulcanization accelerator, listed in Table 17 were charged into a Banbury mixer and were mixed at a temperature of 80° C. and at 77 rpm for 5 minutes. Then, the mixture was mixed with sulfur and the vulcanization accelerator at a temperature of 80° C. on 10 inch open rolls. The resultant compound

TABLE 16

|  |  |  | Example 45 | Reference Example 2 | Example 46 | Reference Example 3 | Example 47 | Reference Example 4 | Example 48 | Reference Example 5 |
|---|---|---|---|---|---|---|---|---|---|---|
|  | Reinforced rubber composition (Sample 22) | (part) | 19.6 | 0 | 19.6 | 0 | 19.6 | 0 | 19.6 | 0 |
|  | NR | (part) | 87.2 | 100 | 87.2 | 100 | 87.2 | 100 | 87.2 | 100 |
| Compound to be vulcanized | Carbon black (ISAF) | (part) | 30 | 30 | 40 | 40 | 60 | 60 | 70 | 70 |
|  | Process oil | (part) | 5 | | | | | | | |
|  | Zinc oxide | (part) | 5 | | | | | | | |
|  | Stearic acid | (part) | 3 | | | | | | | |
|  | 810 NA | (part) | 1.2 | " | " | " | " | " | " | " |
|  | #224 | (part) | 0.8 | | | | | | | |
|  | DM | (part) | 0.6 | | | | | | | |
|  | D | (part) | 0.2 | | | | | | | |
|  | Sulfur | (part) | 2.5 | | | | | | | |
|  | Ratio of nylon fiber to total rubber | (PHR) | 6.4 | 0 | 6.4 | 0 | 6.4 | 0 | 6.4 | 0 |
| Fiber-reinforced elastic product | 50% Modulus | (kg/cm$^2$) | 54 | 12 | 59 | 16 | 79 | 24 | 86 | 30 |
|  | 100% Modulus | (kg/cm$^2$) | 79 | 21 | 87 | 27 | 114 | 43 | 124 | 55 |
|  | 200% Modulus | (kg/cm$^2$) | 125 | 53 | 144 | 69 | 187 | 108 | 196 | 131 |
|  | 300% Modulus | (kg/cm$^2$) | 189 | 104 | 217 | 132 | 261 | 184 | — | 213 |
|  | Tensile break strength | (kg/cm$^2$) | 263 | 277 | 299 | 291 | 285 | 299 | 280 | 297 |
|  | Elongation | (%) | 400 | 510 | 410 | 480 | 340 | 430 | 300 | 410 |
|  | Peeling strength | (kg) | >50 | >50 | >50 | >50 | >50 | >50 | >50 | >50 |

EXAMPLES 49 TO 52 AND REFERENCE EXAMPLE 6

Elastic products were obtained from NR and sample 22 obtained above (Examples 49 to 52) and from NR was vulcanized in the same manner in Example 42.
The results are shown in Tables 17 to 19.

TABLE 17

|  |  |  | Example 49 | Example 50 | Example 51 | Example 52 | Reference Example 6 |
|---|---|---|---|---|---|---|---|
|  | Reinforced rubber composition (Sample 22) | (part) | 6.1 | 12.3 | 19.6 | 30.7 | 0 |
|  | NR | (part) | 96.0 | 92.0 | 87.2 | 80.0 | 100 |
| Formulation | Carbon black (ISAF) | (part) | 50 | " | " | " | " |
|  | Process oil | (part) | 5 |  |  |  |  |
|  | Zinc oxide | (part) | 5 |  |  |  |  |
|  | Stearic acid | (part) | 3 |  |  |  |  |
|  | 810 NA | (part) | 1.2 |  |  |  |  |
|  | #224 | (part) | 0.8 |  |  |  |  |
|  | DM | (part) | 0.6 |  |  |  |  |
|  | D | (part) | 0.2 |  |  |  |  |
|  | Sulfur | (part) | 2.5 |  |  |  |  |
| Ratio of nylon fiber to total rubber content |  | (PHR) | 2 | 4 | 6.4 | 10 | 0 |

TABLE 18

|  |  |  | Example 49 | Example 50 | Example 51 | Example 52 | Reference Example 6 |
|---|---|---|---|---|---|---|---|
| Physical properties of Unvulcanized compound | Mooney viscosity $ML_{1+4}$ | (100° C.) | 88 | 90 | 90 | 85 | 82 |
|  | Tensile characteristics 1) |  |  |  |  |  |  |
|  | 50% Modulus | (kg/cm$^2$) | 11.3 | 18.4 | 23.9 | 43.6 | 4.5 |
|  | 100% Modulus | (kg/cm$^2$) | 16.1 | 27.2 | 35.3 | 60.8 | 4.6 |
|  | 300% Modulus | (kg/cm$^2$) | 31.2 | 53.0 | 65.8 | — | 7.7 |
|  | Tensile break strength | (kg/cm$^2$) | 50.8 | 81.5 | 83.4 | 92.1 | 36.7 |
|  | Elongation | (%) | 470 | 490 | 430 | 290 | 700 |
|  | Mill shrinkage 2) | (%) | 3 | 3 | 2 | 2 | 8 |
|  | Extrusion characteristics Swell ratio 3) | (D/D$_0$) | 1.23 | 1.17 | 1.14 | 1.07 | 1.30 |

(Remarks)
1) A test piece was prepared by pressing a sample at 80° C. by using a mold having a thickness of 2 mm, followed by quenching with dry ice to solidify the rubber sheet and, then, was cut by a #3 dumbbell die. The determination was carried out at a room temperature and at a stress rate of 100 mm/min.
2) Determined according to an ASTM-D-1917 method
3) Determined by using a Kokashiki flow tester having a nozzle of L/D = 2 and D = 1 mm under the conditions of an extrusion temperature of 100° C. and an extrusion pressure of 80 Kg/cm$^2$.

TABLE 19

| Physical properties of elastic product |  | Vulcanization time (min) | Example 49 | Example 50 | Example 51 | Example 52 | Reference Example 6 |
|---|---|---|---|---|---|---|---|
| Hardness (JISA) |  | 40 | 70 | 72 | 75 | 77 | 66 |
| 50% Modulus | (kg/cm$^2$) | " | 33 | 43 | 63 | 81 | 20 |
| 100% Modulus | (kg/cm$^2$) | " | 57 | 75 | 101 | 126 | 36 |
| 200% Modulus | (kg/cm$^2$) | " | 117 | 137 | 166 | 194 | 95 |
| 300% Modulus | (kg/cm$^2$) | " | 186 | 198 | 227 | 248 | 164 |
| Tensile break strength | (kg/cm$^2$) | " | 306 | 302 | 298 | 280 | 317 |
| Elongation | (%) | " | 500 | 490 | 441 | 380 | 550 |
| Tear strength | (kg/cm) | " | 122 | 96 | 98 | 92 | 91 |
| Permanent elongation | (%) | " | 12 | 13 | 13 | 15 | 11 |
| Repulsion | (%) | 30 | 50 | 48 | 46 | 46 | 50 |
| PICO Abrasion Index |  | " | 153 | 168 | 187 | 175 | 142 |
| Heat generation amount | (°C.) | " | 21 | 21 | 22 | 25 | 20 |
| Strain by heat generation | (%) | " | 5 | 5 | 6 | 7 | 5 |
| Flex resistance Crack initiation | (times) | " | 90000 | 85000 | 70000 | 56000 | 120000 |
| Crack growth | (times) | " | 12000 | 10000 | 7000 | 3700 | 14000 |
| Peeling strength | (kg) | " | >50 | >50 | >50 | >50 | >50 |
| Fatigue life 1) | (times) | 40 | 3010 | 4280 | 8730 | 14300 | 820 |

1) Repeated extension under a constant load and under the conditions of 100° C. and 50 kg/cm$^2$

EXAMPLES 53 TO 57 AND COMPARATIVE EXAMPLES 19 TO 23

Elastic products were prepared in the same manner as in Example 42, except that the compounding formulations (practical formulations) were changed as shown in Table 20. The vulcanization temperature was 150° C. and the vulcanization period was 40 minutes (30 minutes in Example 53 and Comparative Example 19).

The results are shown in Table 20.

TABLE 20

| Example (Ex.) and Comparative Example (Com. Ex.) Nos. |  | Example 53 | Comparative Example 19 | Example 54 | Comparative Example 20 | Example 55 | Comparative Example 21 | Example 56 | Comparative Example 22 | Example 57 | Comparative Example 23 |
|---|---|---|---|---|---|---|---|---|---|---|---|
| Fiber-reinforced | (part) | 19.6 | — | 19.6 | — | 19.6 | — | 19.6 | — | 19.6 | — |

TABLE 20-continued

| Example (Ex.) and Comparative Example (Com. Ex.) Nos. | | | Example 53 | Comparative Example 19 | Example 54 | Comparative Example 20 | Example 55 | Comparative Example 21 | Example 56 | Comparative Example 22 | Example 57 | Comparative Example 23 |
|---|---|---|---|---|---|---|---|---|---|---|---|---|
| Compound to be vulcanized | rubber composition NR | (part) | 47.2 | 60 | 87.2 | 100 | 67.2 | 80 | 82.2 | 95 | 37.2 | 50 |
| | BR 1) | (part) | 40 | 40 | — | — | — | — | 5 | 5 | 50 | 50 |
| | SBR 2) | (part) | — | — | — | — | 20 | 20 | — | — | — | — |
| | Carbon black (HAF) 3) | (part) | 50 | | 50 | | 60 | | 55 | | 65 | |
| | Process oil | (part) | 15 | | 5 | | 5 | | — | | 5 | |
| | Spindle oil 4) | (part) | — | 3 | — | | — | | 10 | | — | |
| | Stearic acid | (part) | 2 | | 2 | | 2 | | 2 | | 2 | |
| | Zinc oxide | (part) | 3.5 | " | 3.5 | " | 5 | " | 4 | " | 5 | " |
| | 810 NA | (part) | 1.8 | | — | | — | | — | | 1 | |
| | Nocrac 300 5) | (part) | — | | — | | — | | 1 | | — | |
| | Tackirol 101 6) | (part) | — | | — | | — | | — | | 0.5 | |
| | Nobs 7) | (part) | 0.7 | | 0.5 | | 0.8 | | 0.8 | | 0.8 | |
| | DM | (part) | 0.3 | | — | | 0.3 | | — | | 0.4 | |
| | Sulfur | (part) | 1.5 | | 1.5 | | 5.5 | | 2 | | 2.5 | |
| Reinforced elastic product | 50% Modulus | (kg/cm²) | 44 | 12 | 58 | 15 | 97 | 47 | 61 | 18 | 83 | 31 |
| | 100% Modulus | (kg/cm²) | 66 | 22 | 87 | 28 | 155 | 92 | 95 | 35 | 123 | 56 |
| | 300% Modulus | (kg/cm²) | 155 | 99 | 215 | 143 | — | — | 231 | 156 | — | 209 |
| | Tensile break strength | (kg/cm²) | 247 | 240 | 246 | 251 | 177 | 144 | 248 | 250 | 208 | 224 |
| | Elongation | (%) | 480 | 540 | 350 | 460 | 130 | 150 | 330 | 440 | 220 | 330 |

We claim:

1. A process for producing a fiber-reinforced elastic product comprising the steps of:
   (1) preparing a compound of a fiber-reinforced rubber composition and a vulcanizing agent wherein:
   (A) said fiber-reinforced rubber composition comprises a vulcanizable rubber in which fine short fibers of polyamide are buried:
   (B) said fine short fibers of polyamide having an average diameter of 0.05 to 0.8 μm;
   (C) said vulcanizable rubber and said fine short fibers of polyamide are grafted to each other at an interface of said fine short fibers and said vulcanizable rubber, by a process comprising the steps of:
   (a) mixing at a temperature of not less than the melting point of said polyamide but not more than 270° C.:
      a vulcanizable rubber,
      a polyamide, and
      a resol alkylphenol formaldehyde resin precondensate, or
      a novolak phenol formaldehyde resin precondensate and a compound capable of producing formaldehyde upon heating together to form a mixture.
   (b) extruding said mixture at a temperature of not less than the melting point of said polyamide, but not more than 270° C. to form an extrudate; and
   (c) drawing said extrudate at a temperature of less than the melting point of said fine short fibers of polyamide;
      (i) the amount of said fine short fibers of polyamide in said compositions being 1 to 70 parts by weight based on 100 parts by weight of said vulcanizable rubber in the case of said resol alkylphenol formaldehyde resin precondensate and the amount of said resol alkylphenol formaldehyde precondensate being 0.2 to 2.5 parts by weight based on 100 parts by weight of said vulcanizable rubber and said fine short fibers of polyamide, when said resol alkylphenol formaldehyde precondensate is employed to join said fine short fibers of polyamide and said vulcanizable rubber or (ii) the amount of said fine short fibers being 1 to 100 parts by weight based on 100 parts by weight of said vulcanizable rubber in the case of said novolak phenol formaldehyde resin precondensate and the amount of said novolak phenol formaldehyde precondensate being 0.2 to 5.0 parts by weight based on 100 parts by weight of said vulcanizable rubber and said fine short fibers of polyamide, when said novolak phenol formaldehyde precondensate is employed to join said fine short fibers of polyamide and said vulcanizable rubber; and (2) vulcanizing the resultant compound.

2. A process as claimed in claim 1, wherein said vulcanizable rubber is natural rubber, cis-1,4-polybutadiene, polyisoprene, polychloroprene, styrene-butadiene copolymer rubber, isoprene-isobutylene copolymer rubber, ethylene-propylene-unconjugated diene terpolymer or any mixture thereof.

3. A process as claimed in claim 1, wherein said vulcanizable rubber is natural rubber.

4. A process as claimed in claim 1 wherein said compound is prepared from said fiber-reinforced rubber composition, a vulcanizing agent, and additional vulcanizable rubber, the amount of said fibers being 1 to 20 parts by weight based on 100 parts by weight of the total vulcanizable rubber in said compound.

5. A process as claimed in claim 1 wherein, the ratio of the vulcanizable rubber grafted onto the fibers compared to the fibers, is 3% to 25% by weight.

6. A process as claimed in claim 4 wherein the graft ratio is 3% to 25% by weight.

7. A process as claimed in claim 4, wherein said vulcanizable rubber is natural rubber, cis-1,4-polybutadiene, polyisoprene, polychloroprene, styrene-butadiene copolymer rubber, isoprene-isobutylene copolymer rubber, ethylene-propylene-unconjugated diene terpolymer or any mixture thereof.

8. A process as claimed in claim 4, wherein said vulcanizable rubber is natural rubber.

9. A fiber-reinforced product prepared in accordance with the process of claim 1.

10. A fiber-reinforced product prepared in accordance with the process of claim 4.

11. A fiber-reinforced rubber composition comprising vulcanizable rubber in which fine short fibers of fiber-forming polyamide having

groups are buried, wherein:
the average diameter of said fine short fibers is 0.05 to 0.8 μm;
said vulcanizable rubber and said polyamide fibers are grafted to each other through (i) a resol alkylphenol formaldehyde resin precondensate, or (ii) a novolak phenol formaldehyde resin precondensate, by heating a mixture of said vulcanizable rubber, said polyamide, and (i) the resol alkylphenol formaldehyde resin precondensate, or (ii) the novolak phenol formaldehyde resin precondensate, and a compound capable of producing formaldehyde, at a temperature of not less than the melting point of said polyamide but not more than 270° C.;
the amount of said fibers in said composition is (A) 1 to 70 parts by weight based on 100 parts by weight of the rubber when the resol alkylphenol formaldehyde resin precondensate is employed, or (B) 1 to 100 parts by weight based on 100 parts by weight of the rubber when the novolak phenol formaldehyde resin precondensate is employed;
the amount of the resol alkylphenol formaldehyde resin precondensate or the novolak phenol formaldehyde resin precondensate is 0.2 to 2.5 parts by weight of said resol alkylphenol formaldehyde resin precondensate or 0.2 to 5 parts by weight of said novolak phenol formaldehyde resin precondensate based on 100 parts by weight of said vulcanizable rubber and said polyamide.

12. A fiber-reinforced rubber composition as claimed in claim 11 wherein, the ratio of the vulcanizable rubber grafted onto the fibers compared to the fibers is 3% to 25% by weight.

13. A fiber-reinforced rubber composition as claimed in claim 11, wherein said vulcanizable rubber is natural rubber, cis-1,4-polybutadiene, polyisoprene, polychloroprene, styrene-butadiene copolymer rubber, isoprene-isobutylene copolymer rubber, ethylene-propylene-unconjugated diene terpolymer or any mixture thereof.

14. A fiber-reinforced rubber composition as claimed in claim 11, wherein said vulcanizable rubber is natural rubber.

15. A vulcanizate of the fiber-reinforced rubber composition of claim 11.

16. A process for producing a fiber-reinforced rubber composition comprising the steps of:
mixing vulcanizable rubber, 1 to 100 parts by weight of fiber-forming polyamide based on 100 parts by weight of the vulcanizable rubber, said polyamide having

groups and having a number-average molecular weight of less than 200,000, 0.2 to 5 parts by weight, based on 100 parts by weight of the total amount of the rubber and the polyamide, of a novolak phenol formaldehyde resin precondensate, and a compound capable of producing formaldehyde upon heating together at a temperature of not less than the melting point of the polyamide, but not more than 270° C.;
extruding the mixture from an extruder at a temperature of not less than the melting point of the polyamide, but not more than 270° C.; and
drawing an extrudate at a temperature of less than the melting point of the polyamide.

17. A fiber-reinforced rubber composition prepared in accordance with the process of claim 16.

18. A fiber-reinforced rubber composition as claimed in claim 17, wherein the melting point of said polyamide is 190° C. to 235° C.

19. A fiber-reinforced composition as claimed in claim 17, wherein the novolak phenol formaldehyde resin precondensate is a precondensate having the formula

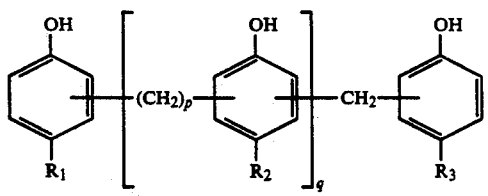

wherein $R_1$, $R_2$ and $R_3$ are independently a hydrogen atom, or an alkyl group having 1 to 15 carbon atoms, p is 1 or 2, and q is a number of 0 to 13;

a styrenated phenol-phenol-formaldehyde resin precondensate;
a p-cumylphenol-formaldehyde resin precondensate;
a phenyl phenol-formaldehyde resin precondensate;
a lactam-bisphenol F-formaldehyde resin precondensate;
a bisphenol A-formaldehyde resin precondensate; or
a xylenol-formaldehyde resin precondensate.

20. A fiber-reinforced rubber composition as claimed in claim 17 wherein the compound capable of producing formaldehyde upon heating is used in an amount of 0.02 to 1 part by weight based on 100 parts by weight of the vulcanizable rubber.

* * * * *